(12) United States Patent
Yao et al.

(10) Patent No.: US 8,788,446 B2
(45) Date of Patent: Jul. 22, 2014

(54) FUZZY INFERENCE METHODS, AND APPARATUSES, SYSTEMS AND APPARATUS USING SUCH INFERENCE APPARATUS

(75) Inventors: Liqun Yao, Groby (GB); Da-Wei Gu, Leicester (GB); Ian Postlethwaite, Newcastle upon Tyne (GB)

(73) Assignees: University of Liecester, Leicestershire (GB); BAE plc, London (GB)

( * ) Notice: Subject to any disclaimer, the term of this patent is extended or adjusted under 35 U.S.C. 154(b) by 197 days.

(21) Appl. No.: 13/391,072

(22) PCT Filed: Aug. 19, 2010

(86) PCT No.: PCT/GB2010/051378
§ 371 (c)(1),
(2), (4) Date: Aug. 6, 2012

(87) PCT Pub. No.: WO2011/021046
PCT Pub. Date: Feb. 24, 2011

(65) Prior Publication Data
US 2013/0103630 A1    Apr. 25, 2013

(30) Foreign Application Priority Data
Aug. 19, 2009 (EP) .................................... 09168220

(51) Int. Cl.
*G06N 5/00* (2006.01)
(52) U.S. Cl.
USPC ................................... 706/47; 700/28; 704/9
(58) Field of Classification Search
USPC ........................................................ 706/47
See application file for complete search history.

(56) References Cited

U.S. PATENT DOCUMENTS

| | | | |
|---|---|---|---|
| 5,414,645 | A | 5/1995 | Hirano |
| 5,719,999 | A | 2/1998 | Nishidai et al. |
| 5,740,323 | A | 4/1998 | Nomura et al. |
| 5,919,267 | A | 7/1999 | Urnes et al. |
| 2002/0165841 | A1 | 11/2002 | Quaile |
| 2003/0065632 | A1* | 4/2003 | Hubey ............................ 706/15 |
| 2005/0065753 | A1 | 3/2005 | Bigus et al. |
| 2006/0218108 | A1* | 9/2006 | Panfilov et al. ................. 706/13 |
| 2011/0166716 | A9* | 7/2011 | Rovnyak et al. .............. 700/287 |

FOREIGN PATENT DOCUMENTS

| | | |
|---|---|---|
| EP | 1 085 460 A2 | 3/2001 |
| JP | 4-171536 A | 6/1992 |

OTHER PUBLICATIONS

International Search Report (PCT/ISA/210) issued on Dec. 16, 2010 for International Application No. PCT/GB2010/051378.
Written Opinion (PCT/ISA/237) issued on Dec. 16, 2010 for International Application No. PCT/GB2010/051378.

(Continued)

*Primary Examiner* — Jeffrey A Gaffin
*Assistant Examiner* — Kalpana Bharadwaj
(74) *Attorney, Agent, or Firm* — Maine Cernota & Rardin

(57) ABSTRACT

A health monitoring system for complex networked apparatus includes a number of neuro-fuzzy inference apparatuses feeding inference results into a data fusion hierarchy. At each level in the hierarchy, fuzzy inference is applied to generate a desired output signal by processing selected input signals in accordance with a knowledge base defining fuzzy membership functions and fuzzy inference rules defined in advance. The knowledge base includes alternative definitions of membership functions and/or inference rules. The apparatus selects which definition to use according to environmental or other conditions, and predetermined selection criteria.

20 Claims, 10 Drawing Sheets

(56) References Cited

OTHER PUBLICATIONS

International Preliminary Report on Patentability (PCT/IB373) issued on Feb. 21, 2012 for International Application No. PCT/GB2010/051378.
European Search Report (EPO Form 1503) issued on Feb. 8, 2010.
International Search Report (PCT/ISA/210) issued on Oct. 5, 2010 for International Application No. PCT/GB2010/051376.
Written Opinion (PCT/ISA/237) issued on Oct. 5, 2010 for International Application No. PCT/GB2010/051376.
International Preliminary Report on Patentability (PCT/IB373) issued on Feb. 21, 2012 for International Application No. PCT/GB2010/051376.
European Search Report (EPO Form 1503) issued on Feb. 16, 2010.
Patents Act 1977, Search Report under Section 17(6), issued on Jan. 8, 2010.
Patent Act 1977, Search Report under Section 17, issued on Dec. 22, 2009.
Gegov, "Complexity Management in Fuzzy Systems", Studies in Fuzziness and Soft Computing Springer, Dec. 31, 2007, pp. 42-43.
Hu et al., "Handbook of Neural Network Signal Processing", The Electrical Engineering and Applied Processing series—CRC Press, Dec. 31, 2002, 384 pages.
Wang, "An Intelligent system for Machinery Condition Monitoring", IEEE Transactions on Fuzzy Systems, IEEE Service Center, Piscataway, NJ, US, vol. 16, No. 1, Feb. 1, 2008, 14, pp. 110-122.
Jang, "Anfis: Adaptive-Network-Based Fuzzy Inference System", IEEE Transactions on Systems, Man and Cybernetics, IEEE Inc., New York, US, vol. 23, No. 3, May 1, 1993, pp. 665-684.
Mihai, "Using a Hidden Mathematical Model Generated by Input-Output Data. The Reliability of a Neuro-Fuzzy Controller for a Servodrive", Proceedings of the $8^{th}$ WSEAS Conference on Mathematical Methods and Computational Technique in Electrical Engineering, Oct. 17, 2006, pp. 288-293.
Kim et al., "A New Fuzzy Adaptive Controller Using a Robust Property of Fuzzy Controller", Intelligent Robots and Systems '93, IROS '93. Proceedings of The 1993 IEIEE/RSJ International Conference on Yokohama, Japan, Jul. 1993, New York, NY, USA, vol. 2, 5 pages.
Larov. "Modular Reconfigurable Controllers With Fuzzy-Meta-Control", Fuzzy Systems, IEEE World Congress on Computational Intelligence Proceedings of The Third IEEE Conference on Orlando, FL, USA, Jun. 1994, pp. 1564-1567.
Raju et al., "Adaptive Hierarchical Fuzzy Controller", IEEE Transactions on Systems, Man and Cybernetics, IEEE Inc., New York, US, vol. 23, No. 4, Jul. 1, 1993, 6 pages.
Li et al., "Self-Organizing Neuro-Fuzzy System for Control of Unknown Plants", IEEE Transactions on Fuzzy Systems, IEEE, Service Center, Piscataway, NJ, US, vol. 11, No. 1, Feb. 1, 2003, 16 pages.
Aja-Fenandez et al., "Fast Inference in SAM Fuzzy Systems Using Transition Matrices", IEEE Transactions on Fuzzy Systems, vol. 12, No. 2, Apr. 2004, pp. 170-182.
Browne et al., "Knowledge-elicitation and data-mining: fusing human and industrial plant information", Science Direct, Engineering Applications of Artificial Intelligence 19, 2006, pp. 345-359.
Yao et al., "Design, implementation and testing of an intelligent knowledge-based system for the supervisory control of a hot rolling mill,", Science Direct, Journal of Process Control 15, 2005, pp. 615-628.
"Formal Simplification of Fuzzy Rule Bases Systems", 56 pages.
Taur et al., "Hierarchical Fuzzy Neural Networks for Pattern Classification", 37 pages.

* cited by examiner

FUZZY INFERENCE METHODS, AND APPARATUSES, SYSTEMS AND APPARATUS USING SUCH INFERENCE APPARATUS

RELATED APPLICATIONS

This application is a national phase application filed under 35 USC §371 of PCT Application No. PCT/GB2010/051378 with an International filing date of Aug. 19, 2010 which claims priority of EP Patent Application 09168220.3 filed Aug. 19, 2009. Each of these applications is herein incorporated by reference in their entirety for all purposes.

FIELD OF THE INVENTION

The invention relates to methods and apparatuses for performing a fuzzy inference implemented in a programmable data processor or computer. The invention may be applied in neuro-fuzzy inference systems, for example to allow real-time fuzzy health monitoring in complex systems and hierarchies of systems. The invention may be applied in simple or complex fuzzy control applications, whether neuro-fuzzy or conventional.

BACKGROUND OF THE INVENTION

An example of an application for neuro-fuzzy inference apparatus is in the automation of health management (HM) in a complex system, in particular among a "system of systems" having network enabled capability (NEC). Monitoring such systems effectively is a difficult task, due to the large numbers of sensors, actuators and entities along with the uncertainty of the environment. A monitoring and diagnostic capability integrated with prognostics developments will enable the provision of: 1) real-time support of highly integrated NEC systems; 2) management of uncertainty/change in an NEC environment; 3) expert (human) knowledge for HM; and 4) real-time monitoring information associated with the health of system-of-systems (SoS) to assist human decision-making. Health management focuses on the reliable detection and monitoring of faults and failures of distributed assets. A degree of diagnostic capability already exists at the component level. The main challenge is to bring health management to different levels across a distributed system, as in NEC, thereby enabling major improvements in supportability and reconfiguration.

System diagnosis is an important part of HM systems. Diagnostics provide health information for use in prognostics, reconfiguration and decision-making functions. In recent years, a class of artificial intelligent (AI) technologies has been introduced to help engineers deal with large-scale complex network enabled systems in uncertain environments. Neuro-fuzzy inference (NFI) systems are possibly the best tools available for accounting for qualitative aspects of complexity such as the uncertainty of the environment and are well suited for decision making tasks. However, in such an NEC environment, the associated NFI operations in the fuzzification, the inference and the defuzzification stages increase the quantitative complexity of the problem; the quantitative complexity of problems increases the number of rules in the NFI system, when the number of inputs gets bigger.

In a parallel application having the same priority date and filing date as the present application, we disclose various measures for managing complexity in health monitoring applications for complex networked systems. In these systems, and in neuro-fuzzy or conventional fuzzy inference processors generally, there is a need to manage the low level computation of fuzzy inference in an efficient manner. In any fuzzy inference process, there is a need to evaluate membership functions rapidly according to which rules are fired and which are not. The logic and arithmetic steps involved at the lowest level become very onerous when the number of rules and variables increase, especially for applications in monitoring and control where real time decision making is important.

The invention has as its object to enable a reduction of the computational burden involved in computing fuzzy inferences.

SUMMARY OF THE INVENTION

The invention provides a method of performing a fuzzy inference implemented in a programmable data processor or computer, the method comprising:
(a) receiving one or more input values and generating an array of values each representing a membership degree of a respective input value in a pre-defined fuzzy set;
(b) forming a vector sum of the array of membership degree values and a rule array representing a fuzzy rule of a fuzzy rule base; and
(c) processing the elements of said vector sum to determine a firing strength for the rule represented by said rule array.

The rule array in a preferred embodiment comprises a set of binary values, whereby the vector sum step places each of the membership degree values, which initially all lie in a predetermined numerical range, into one of two distinct numerical ranges, according to a corresponding binary value in the rule array.

Whereas, conventionally, such binary values would be used to select elements of the membership degree vector by logical process steps, the novel method treats them as numbers to be processed by simple arithmetic. By shifting irrelevant values numerically out of range of the relevant ones, the firing strength of the rule can be deduced without first taking logical steps to exclude the irrelevant values. Computational burden is thereby reduced, which can be very significant in a real-time system handling hundreds, even thousands of individual rules per cycle. Parallel processing is facilitated.

The binary array will typically be the complement of an array representing the rule in conventional fuzzy logic notation, and the method may comprise a preliminary step of converting a rule base into said binary array representation, prior to repeated performance of the method in a real-time processing application.

The step (c) may comprise selecting a minimum element in said vector sum as the firing strength for the rule represented by said rule array. Taking the minimum implements the most common or 'conjunction' method of determining firing strength in fuzzy logic, but other functions are possible. 'Minimum' in this context refers to the minimum of the membership degrees represented by the elements of the array, regardless of the format in which they are physically represented within the apparatus. Typically these will be the same thing.

The method may further comprise the step (d) of repeating steps (b) and (c) for a plurality of rule arrays, each representing a different fuzzy rule and a step (e) of calculating an output value by reference to the firing strengths of the plurality of rules.

The step (e) may include identifying a dominant rule among a group of rules, by identifying a maximum firing strength among the firing strengths calculated in step (c).

The group of rules may be a group of rules associated with a particular linguistic value of said output, the maximum firing strength indicating a dominant rule, all other rules in the group being eliminated from the calculation of the output value. The method may be performed simultaneously for said group of rules and for other groups of rules associated with other linguistic values of the same output. The method may be performed simultaneously for yet further groups associated with linguistic values of a further output value.

The exact form of representation of the values in the said arrays is a matter of detailed implementation in whatever storage registers and arithmetic circuits are provided. Ranges may in principle be inverted so that 'minimum' and 'maximum', 'greater than' etc. have to be interpreted in the opposite way from normal, without departing from the principle and scope of the invention.

As explained further below, many variations are possible within the principle of the invention as set forth above.

The features of the invention can be applied in any fuzzy inference processor, not limited to those implementing health monitoring in a system-of-systems, which is the primary application example presented below. Such a processor can be implemented by provision of a computer program product to cause a programmable data processing device to implement the steps of the method as set forth above.

The invention further comprises an automated control system or monitoring system including an inference apparatus arranged to receive a plurality of input signals from sensors coupled to a controlled apparatus, to determine a set of membership degrees for each input and to perform fuzzy inference by a method as set forth above. In a control system, the output value of the fuzzy inference (after defuzzification and subject to any further processing that may be applied) is applied to influence the state of the apparatus by feedback. In a monitoring system, the output value of the fuzzy inference is provided as an output signal representing a condition or status of the apparatus or its environment.

The invention may be applied in a distributed data processing system for monitoring the condition of a system of discrete apparatuses over time, the monitoring system comprising a hierarchy in which a higher level monitoring apparatus is supplied with input signals from a plurality of lower level monitoring apparatus, each lower level monitoring apparatus comprising one or more fuzzy inference processor for processing a plurality of input signals relating to its respective monitored apparatus and for generating an output signal representing the condition of its monitored apparatus, the higher level monitoring apparatus comprising at least one fuzzy inference processor for receiving as inputs the output signals of plural lower level monitoring apparatuses, and for generating a higher level output signal representing the condition of the system of discrete apparatuses as a whole. Any or all of the inference processors in the monitoring system may be implemented using the invention as set forth above.

These and other aspects, optional features and advantages of the invention will be apparent to the skilled reader, from consideration of the drawings and description of embodiments which follow.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

Introduction

Figure 1:
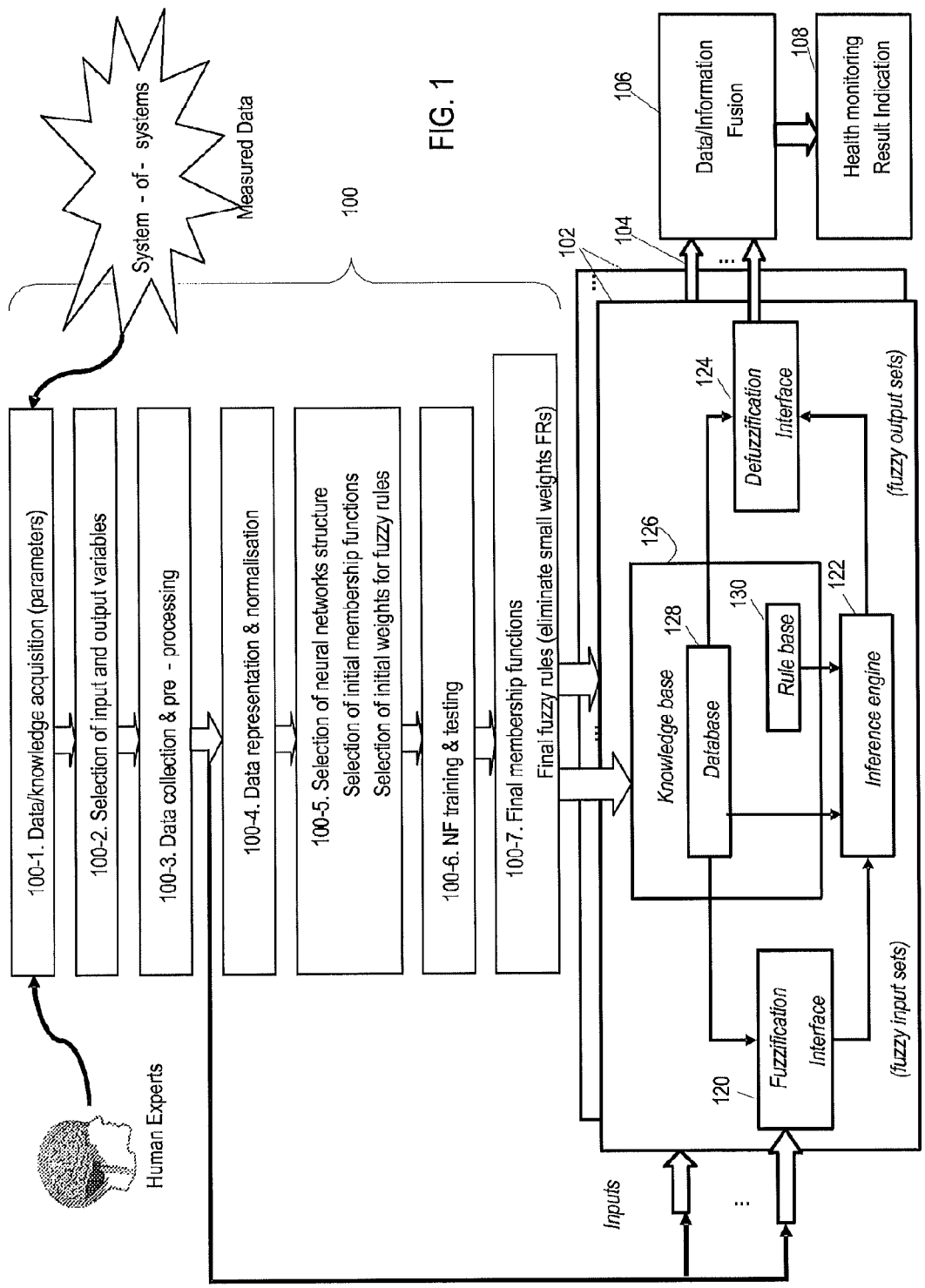
FIG. 1 is an overview of the process and architecture of a complex apparatus for monitoring the condition of a "system or systems", in which the invention may be applied.

The invention which is subject of this application is described below under the heading 'inference process detailed example with vectorisation". The invention will be described in the context of two application examples, the first being a "health" monitoring (HM) system for complex networked systems. The second application example (FIGS. 10-11) is a simple fuzzy control application. The invention is not limited to these examples, but rather is generally applicable wherever fuzzy inferences are to be computed.

Referring to the first application example, a complex, networked "system of systems" involves co-operation between a number of individual entities, each having a high degree of autonomy, and each in itself being a complex combination of subsystems, components etc. The systems within the larger system share some information through a network (shared access network, SAN), while other information is local to the entities, or subsystems within them. Health monitoring may be applied of course to the components of a communications network in itself, as well as a system of functional entities that happen to use a network.

The structure of the health management (HM) system can thus be divided into three hierarchical levels:

High level: Integrated monitoring and diagnosis in network-enabled capability (NEC) environments. For example, the entities collaborate in a mission using the following information: mission failures/changes/reconfiguration/requirements, mission execution time, mission prospects, loss of vehicles, etc.

Mid level: System detection and diagnosis on each entity. For example, entity sensor failures, system or subsystem failures.

Low level: Physical failures—sensors and actuators on each entity. For example, plant and actuator failures.

The HM system varies widely with many different approaches to diagnosis. The challenges include determining the right diagnostic technology or the best combination of technologies for the appropriate level in an HM system in an NEC environment. For example, at the level of individual circuits and components, direct sensors outputting a "good" versus "fail" status can be implemented relatively directly. As one moves up through the hierarchy to subsystems, complete entities, and to the system-of-systems itself, however, the sheer quantity of underlying information is too great to be processed directly. Therefore a degree of aggregation and filtering of the data is performed at each level, with more generalized results being passed to the next level. In these levels, the inventors have identified that fuzzy inference is particularly useful to reduce the volume of data, and particularly neuro-fuzzy inference, based on fuzzy membership functions and inference rules learned in a training environment are the best approach to make the problem manageable.

Using neuro-fuzzy inference (NFI) technology to develop a monitoring and diagnostic capability for health management in complex networks has the potential to integrate human knowledge into a knowledge-base for the mid and high levels of the HM system. This potential can only be realized, however, when the problem of complexity is addressed. Otherwise, the computation complexity of the task will prevent its real-time implementation, and so render it useless for a real system.

Adaptive NFI systems and Hybrid NFI systems are the two most popular NFI systems that simulate a Sugeno type fuzzy inference system (FIS) and a Mamdani type FIS respectively. In Mamdani type FIS the output membership function can be defined independent of the inputs while in Sugeno type FIS each output function is a function of the inputs. It is clear that Sugeno type FIS is efficient for function approximation problems but is not appropriate for diagnosis applications and knowledge (rules), whereas, Mamdani type FIS is universally applicable and can be used for diagnosis applications. A Mamdani type NFI system is therefore used in HM.

A Mamdani type rule is given, for example, by:

"IF x1 is low AND x2 is medium THEN y is high"

The input variables x1 and x2 may be received for example from sensors, from combinations of sensors, or from inferences performed at a lower level in the hierarchy. The linguistic values (LVs) "low", "medium", "high" are characteristic of fuzzy logic, and represent ranges of values for each variable, defined by fuzzy membership functions (MFs). It is assumed that the reader is familiar with fuzzy logic systems generally. If not, the examples described further below will help to illustrate the fuzzy inference in practice.

HM System Architecture

A generalized schematic structure of the novel health management system is shown in FIG. 1. As in conventional NFI systems, the system operates in a set-up or "offline" phase 100, which then enables the configuration of real-time inference modules 102 during actual operation. The system as a whole can be implemented as a mixture of hardware and software. In the offline processing steps 100, particularly the initial steps, to be described below, human intervention may be involved as part of the capture of expert knowledge. In the online processing 102, the system can be made autonomous to any desired degree. The offline processing is likely to be implemented with high-performance computing hardware and software based on established mathematical and simulation toolkits. The online processing modules 102 may also be implemented by suitable software and data structures, running on processing hardware onboard the vehicle of other entity or in a central control facility, depending on the level of the hierarchy at which the modules 102 are to be used. For the example of the HM system for a network enabled system of autonomous vehicles, it is assumed that modules 102 are running on an entity such as an autonomous vehicle, and their outputs 104 are combined by a data/information fusion module 106, constituting the next higher level in a hierarchy. Eventually, at 108, the result indications of the health monitoring process are delivered to a decision-making entity and/or data recording system, which may be human operated or a further automated decision-making apparatus.

Offline Processing Steps

The offline data processing system 100 has seven modules to support the offline data processing:

100-1) Data/knowledge acquisition;
100-2) Selection of input and output variables;
100-3) Data collection and pre-processing;
100-4) Data representation and normalization;
100-5) Selection of neural network structure, initial membership functions and initial weights for fuzzy rules;
100-6) NF training and testing;
100-7) Final membership functions and final fuzzy rules (after eliminating small weighted fuzzy rules). The final membership functions and fuzzy rules are sent to the knowledge base of the online NFI systems 102 for the online reasoning.

The "neuro" part of the neuro-fuzzy inference system is implemented by the adaptive learning of the fuzzy membership functions and rules, during the off line processing stage 100-6. As is well known, during such learning, the prototype fuzzy inference system is defined, using human expert knowledge, by initial membership functions and initial weights for fuzzy rules. This inference system is then exposed to real-world or simulation data on an iterative basis, the membership functions and rules being adjusted incrementally to maximize agreement between measured values and output of the fuzzy inference. Conventionally, such training would be performed with sets of data representing all the expected operating conditions for the apparatus, to ensure that the fuzzy inference can respond appropriately in all circumstances. Toolkits for implementation and training of fuzzy systems are available in development and research tools such as MATLAB®, and need not be detailed here. A novel feature in the present apparatus, however, is the facility to adapt the membership functions and rule bases to different operating conditions at different times. This will be described in more detail below with reference to FIGS. 2 and 3.

Online Processing

Referring to online processing modules 102 of FIG. 1, each comprises a fuzzification interface 120, an inference engine 122 and a defuzzification interface 124. These are generic modules, whether implemented in hardware or, nowadays more likely, software sub-modules. The special adaptation of the fuzzy inference to its given task is stored in a knowledge base 126, which contains a database 128 of membership functions (MFs) for the fuzzification and defuzzification interfaces 120, 124, as well as the rule base 130 by which the inference engine 122 can apply an inference and deduce an appropriate fuzzy output set for the input conditions. The knowledge base in practice can be represented by a matrix or table of values, of a type that will be illustrated later.

Real Time Selection of Fuzzy Rules

Figure 2:
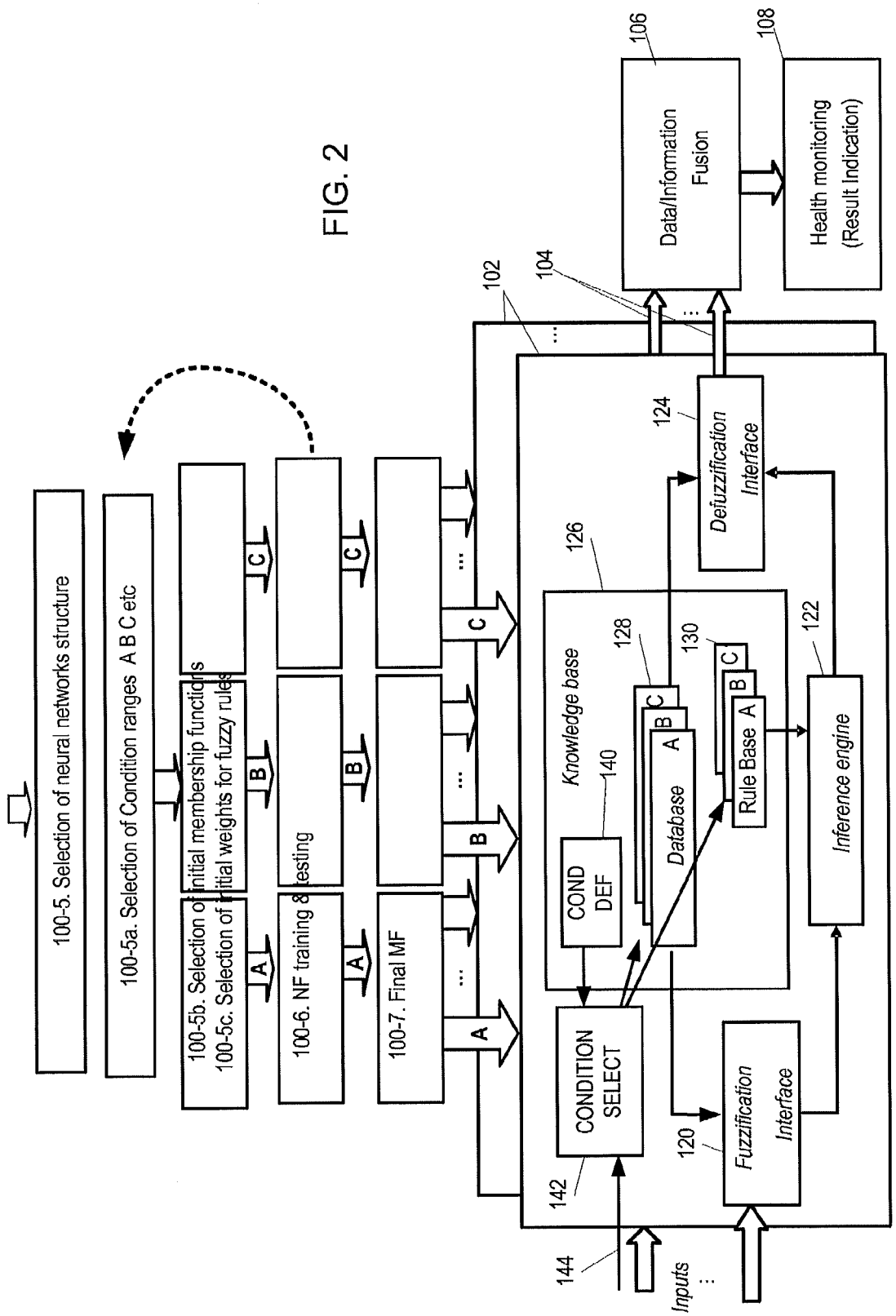
FIG. 2 illustrates in more detail a condition-selected rule base implemented in the system of FIG. 1 to reduce complexity of a fuzzy inference.

Referring now to FIG. 2, we see expanded the latter steps of the offline and online processing that are applied in the novel system. In real systems which are exposed to widely varying conditions, the inventors have recognized that the optimal rule set that may be obtained from training across that wide range of conditions will likely result in a rule set that is far from ideal for any condition. Further, complexity is increased because the fuzzy inference requires a large number of linguistic values to cover the full range of an input variable with sufficient precision. Rather than try to cover all conditions in a single rule set, the inventors propose that the ranges of conditions experienced by the system are sub-divided into a plurality of condition ranges or regimes and training is performed separately for these, using appropriate subsets of the available training data.

Accordingly, in step 100-5 of FIG. 2, expanded from that shown in FIG. 1, we see that a preliminary step 100-5*a* is performed to identify certain condition ranges or regimes A, B, C. This separate treatment of regimes A, B, C in practice will extend throughout the earlier steps 100-1 to 100-4. The ranges can be defined by human observation and expert design from the outset, and/or semi-automatically by observing tensions arising in initial training across all conditions. As a simple example, appropriate to the field of unmanned aircraft, the weather conditions may be divided into two regimes: 'bad weather' (strong winds) versus 'good weather' (light winds). To obtain a rule base appropriate to both types of condition is a challenge, particularly if one is going to want to compress the rulebase later in a challenging real-time application. As indicated by the labels A, B, C, the concept of condition regimes is adaptable to any type of application, however, and the number of ranges may be two, three or more.

In step 100-5*b* and 100-5*c*, initial membership functions and rule weightings are selected for each regime A, B and C, typically based on expert input. The initial MFs and rules may be identical for the different regimes. If expert knowledge is available, however, training will be faster if initial values suitable to the individual regime are input.

In training step 100-6, training of the NF networks is performed using data sets/simulations which are selected to match the desired regime. In other words, if regime A represents bad weather, data gathered or simulated under good weather conditions are excluded from the training data. After training, step 100-7 records, for each regime separately, the final membership functions, rule weightings and so forth. As an option, indicated by the broken curved arrow, experience in the learning step can be used to re-evaluate the definitions of the condition regimes themselves, and the process repeated.

In the online processing modules 102, the fuzzy inference knowledge base now contains plural databases of membership functions 128A, B, C and rule bases 130A, B, C, in a number corresponding to the different training regimes A, B, C. The knowledge base 126 further comprises condition definition data 140, which encodes rules for determining, from current operating conditions, which regime A, B or C actually applies. This data is defined in steps 100-3 modified if appropriate through steps 100-4, 100-5 and so on. A condition regime selector 142 uses this definition data as a reference against which to compare current input data 144, and selects a current regime in real time. The data 128A, B, C and 130A, B, C for the current regime is then selected as the data which is loaded into fuzzification interface, 120, inference engine 122 and defuzzification interface 124 for the performance of fuzzy inferences under current conditions.

The input data 144 on which the condition selection is made may comprise signals from among the existing inputs of the inference process, or some independent input. It may be derived from sensors directly and/or via human control. In the weather example, data 144 may be environmental data on prevailing conditions transmitted from off the vehicle. The data transmitted may be a wind speed measurement, for example, for comparison with thresholds encoded in the definition data 140, or it may be an explicit statement that regime A, B or whatever applies.

In any case, the ability for the fuzzy processing to adapt to different regimes in real time has important benefits in reducing the complexity, and speeding up the process time, as the example below will illustrate. The skilled reader will appreciate that care should be taken in designing the condition regimes and rule bases, as well as the conditions for effecting a transition between regimes in real time, in order that the benefits are not outweighed by drawbacks. The frequency at which the rules are changed should not be so high that it becomes substantial processing overhead, causes excessive downtime or causes 'noise' in the system output. Noise can be minimized by attention to consistency in the rule sets at the boundaries of the regimes. This will be assisted for example by including some overlap between the subsets of training data used for the different regimes in step 100-6.

The same process is performed, sequentially or in parallel, to load the knowledge base(s) of each of the online processing modules 102. As a consequence of optimization steps to be explained further below, each module is a single output (MISO) inference system. While a particular MISO module may include different regimes in the same manner as the one just described, the variation of operating conditions may affect the inference in a parallel module completely differently: each module 102 may thus have its own definitions of regimes, or may not need subdivision of regimes at all. Some modules can be designed to allow rapid reassessment of the applicable regime and frequent changes, while others will change only rarely.

Management of Complexity in NFI System

Having adopted the above real-time-switchable structure for the neuro-fuzzy inference, various measures can be applied to reduce complexity. The management of complexity in NFI systems relies on the basic properties of fuzzy rule bases. These properties reflect the extent to which linguistic values of inputs and outputs are available as well as the type of mapping between the linguistic values of the inputs and corresponding linguistic values of the outputs. The NFI system is mostly useful in modelling complex systems that can be observed by humans because it makes use of linguistic variables as its antecedents and consequents. These linguistic variables can be naturally represented by fuzzy sets and logical connectives of these sets.

Four main properties are usually required for the rule base: continuity, consistency, completeness, and monotonicity. The continuity guarantees that small variations of the input do not induce big variations in the output. Consistency means that if two or more rules are simultaneously fired their conclusions are coherent. Completeness means that for any possible input vector, at least one rule is fired; there is no inference breaking. Monotonicity means that every possible output vector is mapped from only one of the input vectors.

In the HM system, we consider managing and reducing the complexity broadly by three measures:

1) transforming formally the multiple rule base (MRB) system into an equivalent single rule base (SRB) system;

2) converting the multiple input and multiple output (MIMO) SRB system into an equivalent collection of MISO SRB systems; and 3) reducing the rules by an embedded (real time) optimizing algorithm in the SRB system to give an SRBO system.

These three measures are similar to what is described for example in the book "Complexity Management in Fuzzy Systems: A Rule Base Compression Approach" by Alexander Gegov, Springer, ISBN 978-3-540-38883-8 (Studies in Fuzziness and Soft Computing Volume 211). The basics of these methods therefore do not need to be described here in detail. Only brief outlines will be given.

These three steps, adapted and applied to the neuro-fuzzy inference apparatus of the present application, produce a simplified NFI model which we call NFI-SRBO-MISO. Each of the modules 102 in FIG. 1 implements a respective NFI-SRBO-MISO model. The NFI-SRBO-MISO model is not only capable of reducing the quantitative complexity in NFI systems, it can also speed up the operation of NFI systems for monitoring and diagnostics in real-time.

Regarding the first measure, an SRB system is characterized by the isolated nature of its rule base. An MRB system is a system with some interconnections between its rule bases. An MRB system can be viewed as a fuzzy rule base network whereby all rule bases in a row represent a level (as a temporal hierarchy) and in a column they represent a layer (as a spatial hierarchy). An MRB system with s levels and q layers can be represented by a matrix. The elements $RB_{i,j}$ of the matrix are rule bases, where i=1, ..., s, j=1, ..., q. MRB systems can be viewed as networks whose nodes are SRB systems and whose connections are feedback or feedforward links. Interconnections between the rule bases $RB_{i,j}$ must be given by specifying which output from which rule bases are which inputs to which rule bases. If an output from a rule base is fed back into an input to the same rule base, the interconnection is local; and if an output from a rule base is fed back into an input to another rule base residing in the same or in a different layer, the interconnection is global.

The operation and management of MRB systems is very complicated, and therefore formal methods have been developed to translate an MRB system definition to an equivalent SRB system. This will be done at the Data Collection and Pre-processing stage 100-2, 100-3, when required.

The second optimization step involves translating the rule base from one which describes a multi-output (MIMO) inference process into a set of individual rule bases, each defining a single output (MISO) inference process. This plurality of single output MISO processes is illustrated by the plurality of online processing modules 102 shown in FIG. 1, each having a respective output 104. These modules may operate by time sharing on a single processor, or by separate processors.

The third optimization step includes the optimization of non-monotonic rules (ONR) which is performed partly during the online operation and will be explained in more detail below.

Figure 3:
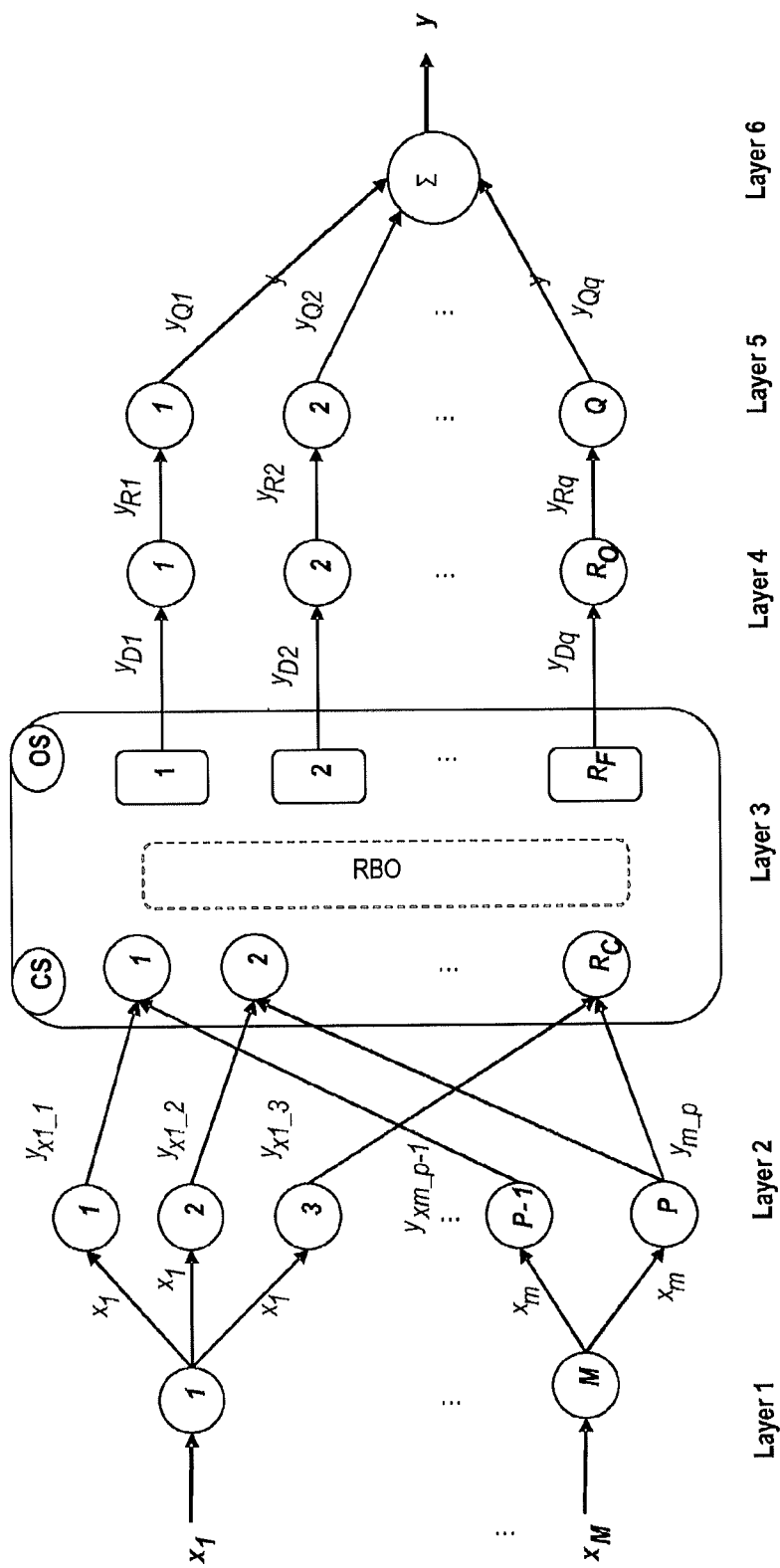
FIG. 3 is a diagram representing an optimizing neuro-fuzzy inference process applicable in the system of FIGS. 1 & 2.

FIG. 3 illustrates the NFI-SRBO-MISO model, implemented by one or other of the modules 120, 122, 124 in a module as illustrated in FIG. 2. The model has a total of six functional layers, described below.

Fuzzification Stage (Layer 1):

In Layer 1 the fuzzification comprises the process of transforming crisp values of inputs $x_1$ to $x_M$ into grades of membership of fuzzy sets, using for the first input the LVs $y_{x1\_1}$ to $y_{x1\_3}$, and similarly for the other inputs through to $y_{m\_1}$ to $y_{m\_p}$. The LVs may be the same for each input, representing for example Negative Large, Near Zero or Positive Large. The LVs appropriate to each variable and the names they are given, are a matter of design choice. In a neuro-fuzzy system, the membership functions applied are typically learned through training. (Learning could in principle be constrained by fixing the membership functions while learning the rule strengths, or vice versa.)

Inference Stage (Layers 2~5):

In Layer 2 the fuzzy membership degrees of the inputs in each rule are mapped onto a firing strength for this rule, which is based on Conjunction (min) fuzzy rule bases in a well-known manner.

In Layer 3 the ONR optimization is performed to remove redundancy by making the rule base monotonic. CS (conventional system) illustrates that there are $R_c$ rules in the fuzzy rule base without optimization, while OS (optimized system) represents the optimized system of only q rules, that is, one for each linguistic value of the output.

In Layer 4 (implication), in which the apparatus calculates the truncated fuzzy membership function for the output in each rule, again in a well-known manner.

Layer 5 (aggregation) maps the fuzzy membership functions for all rules in the optimized system onto an aggregated fuzzy membership function representing the combined output for all the rules.

Defuzzification Stage (Layer 6):

Layer 6 (defuzzification) maps the aggregated fuzzy membership function for an output in the system onto a crisp value for this output.

It is noted that the maximum number of rules in an NFI system R is an exponential function of the number of inputs m and number L of linguistic values (LVs) which each input can take: $R=L^m$. When the number of inputs or the number of LVs increases, it is not difficult to imagine that the number of rules will increase rapidly. The optimization of non-monotonic rules (ONR) arranges monotonic rules in groups and finds the dominant rule in each group. Monotonic rules have the same linguistic value for the output and are very common in fuzzy systems. The dominant rule is the one with the highest firing strength whereby all other rules from the group do not have any impact on the output.

The ONR algorithm guarantees that there will be only monotonic rules in a fuzzy rule base after completion of the optimizing process. In this case, the number of monotonic rules is equal to the number of different linguistic values of outputs. Therefore, the optimizing process can always be performed with full success, i.e. without any residual non-monotonicity being left. Applying ONR allows the information contained in a non-monotonic rule base of a fuzzy system to be compressed by removing the redundancy in the rule base. As a result, the size of the large non-monotonic rule base is reduced significantly in each simulation cycle and the reduced monotonic rule base is equivalent to the large non-monotonic rule base in terms of its behaviour.

When the NFI system with selectable condition regimes is combined with the ONR algorithm in the manner to be described below, the new system will further reduce the rule base and the quantitative complexity in NFI systems, without prejudice to performance.

In the optimization scheme presented above, neural learning is confined to the offline processing 100, while the ONR compression of the resulting rule base occur in simulated and real online operation. The on-line steps in the ONR algorithm reflect only one simulation cycle of a fuzzy system. In the case of more simulation cycles, all on-line steps must be applied for each new cycle. In this case, the computations for each MISO SRB system may be done in parallel, which will reduce the overall computational time.

In conclusion, the set-up and operation of the NFI system in the present example involves the following steps:

1. Data/knowledge acquisition: a) acquisition of task knowledge from the expert; b) acquisition of measured data for different ranges of conditions. For example, data gathered should include data from a perfect weather condition and a bad weather condition with a strong wind; data may be gathered from a real world apparatus or a simulation;
2. Selection of inputs and output variables;
3. Data collection & pre-processing: all data will be saved, pre-processing is based on the requirement of the mission from step 1; if necessary, the transformations from MIMO to MISO model and from MRB to SRB model are performed;

4. Selection of condition ranges for each output variable;
5. Data representation & normalization by selection of neural networks structure, initial membership functions and initial weights for fuzzy rules;
6. NF training and testing (using for example the Fuzzy toolbox in Matlab®), using different sets of measured data to train for different condition ranges;
7. Two or more of final MFs and FRs will be used for the NFI-SRBO-MISO model, each designated for a different condition regime;

On-line Optimization of Rule Base Systems (performed for each data point):

8. Select inputs and output variables from step 2 to set up as inputs and output of the NFI-SRBO-MISO model;
9. From the current conditions identify which regime A, B, etc. applies (for example good or bad weather condition)? This is known by measurement or by explicit status information provided from outside.
10. Select final MFs and FRs A, B, etc. depending on the condition regime;
11 Construct a matrix for the selected rule base system (RBS). The rows of the matrix can be represented by the rule number, linguistic values (LVs) of inputs, firing strength and LVs of output, the columns of the matrix content the values of the rule number, LVs of inputs firing strength and LVs of output. The rule number, the LVs of inputs and output are stored into the RBS matrix;
12. The fuzzification interface 120 maps the crisp value of each input to the system onto a fuzzy value by means of a fuzzy membership degree (FMD). This degree can be obtained from the MFs of the inputs to the fuzzy system. The parameters of the final MFs from step 10 used for the fuzzification of the input.
13. The inference engine 122 maps the FMD of the inputs in each FR from step 10 onto a firing strength for this rule, which is typically based on Conjunction (min) fuzzy rule bases. The results of firing strength can be stored into the RBS matrix;
14. In the RBS matrix, sort all FRs into groups sorted in an increasing order of the LVs of outputs; in other words a 'group' is all the FRs with the same LV as output;
15. Find a dominant rule in each group, meaning the rule with highest firing strength from each group in step 13;
16. For each group, keep the dominant rule and remove any other rules;
17. For the reduced rule base, apply the implication, the aggregation and the defuzzification through interface 124 to generate a current output value;
18. Repeat step 11 to step 17 for each point to generate output values with benefit of neuro-fuzzy learning and reduced complexity appropriate to current conditions.
19. Repeat steps 9, 10 at intervals appropriate to changing conditions. This could be during a mission or at the start of a mission, for weather. It could be more frequent in other applications.

The detailed implementation is a matter for the person skilled in the art to decide. One option that will described further below is to vectorise the data and inference rules, so that several data and inference rules items are processed in parallel or quasi-parallel. Before that, an application example will be described, to aid understanding.

Health Monitoring in Networked System—Detailed Example

Figure 4:
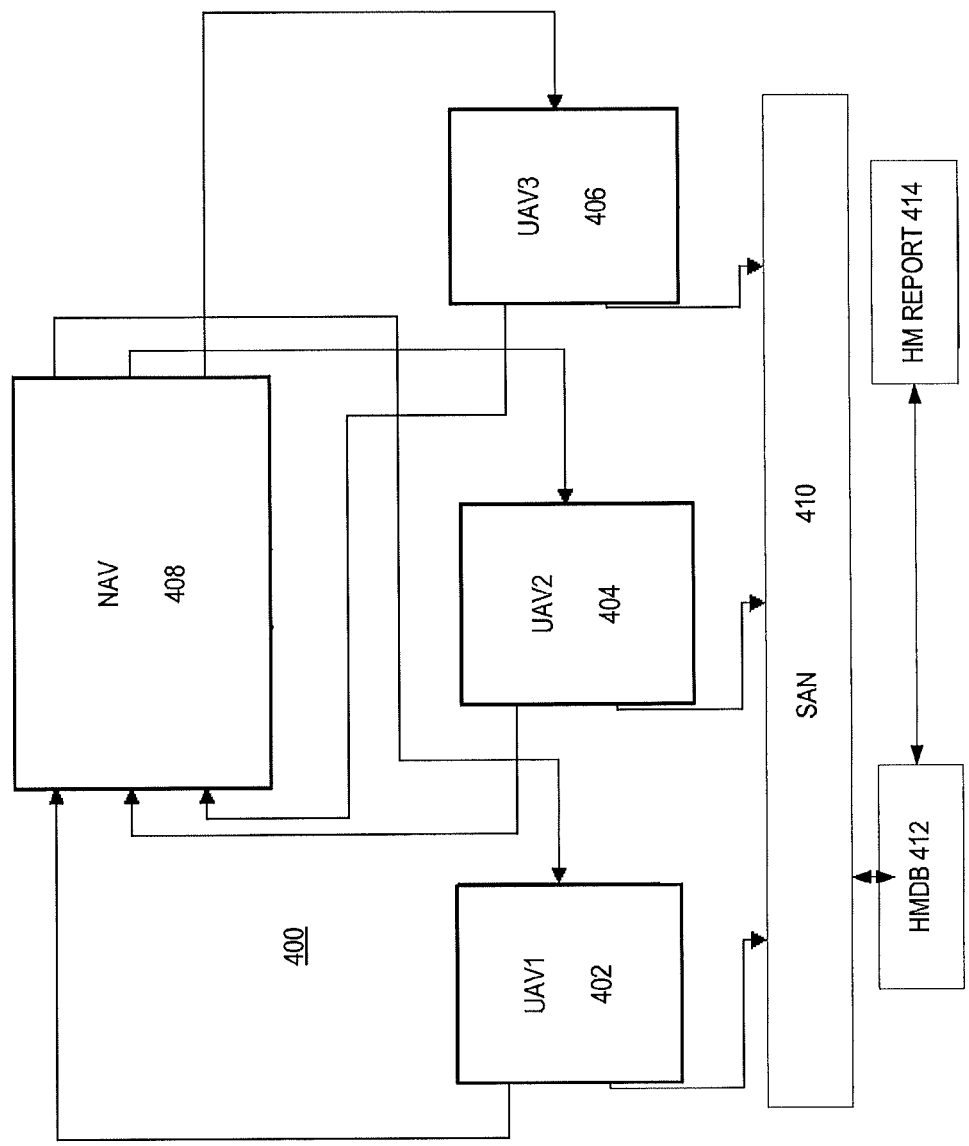
FIG. 4 illustrates an example application in which the invention is applied to help monitoring in a system of unmanned airborne vehicles (UAVs) in a shared access network (SAN) environment.

FIG. 4 illustrates in very simple form an environment in which complex health monitoring issues arise. The "system of systems" (SoS) 400 in this example includes a number of entities 402-408 including unmanned, autonomous aircraft UAV1, UAV2, UAV3 and a central navigation system NAV, communicating with one another in a shared access network (SAN) 410. Individual health information from the entities 402-408 are delivered by their on-board HM systems to the network and collected in a HM database 412. Also delivered to the database are environmental measurements and results, including weather. The health information from each entity is not raw data from the many sensors on board, but is aggregated by NFI processing in the entity into a few key indicators. The highest level of the HM system hierarchy processes the health data at 414 to deliver a high level result or results.

Figure 5:
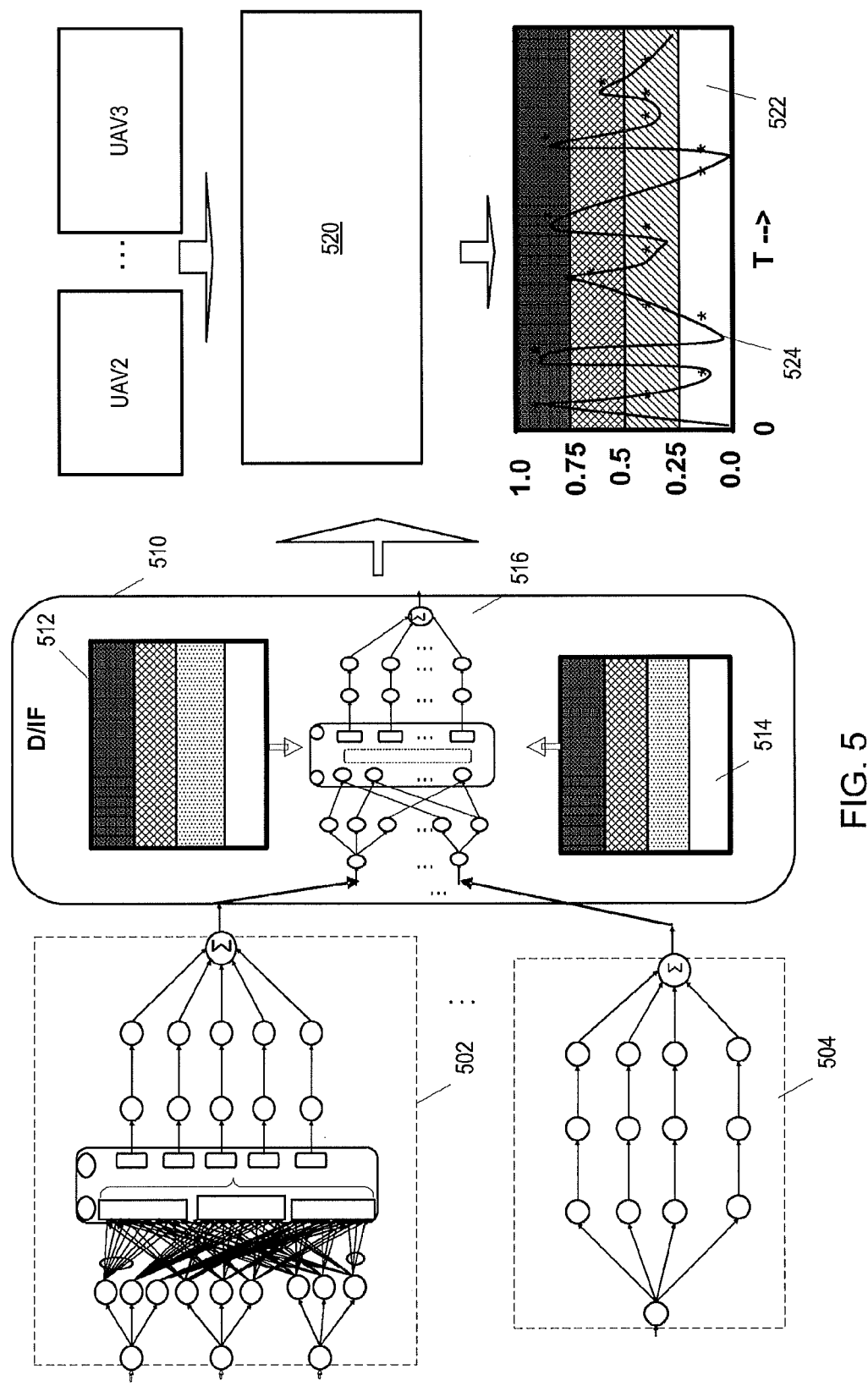
FIG. 5 illustrates the aggregation of inference results into a health monitoring result for a network of autonomous vehicles in the system of FIG. 4.

FIG. 5 shows schematically how multiple NFI-SRBO-MISO models combine to form a more powerful NFI-SRBO-MIMO model at the level of each entity, and how such data is aggregated on board the entity to produce health information as manageable inputs to higher levels, to implement the system of FIG. 4.

The first level of NFI-based health management processing in the FIG. 5 application includes a set of NFI-SRBO-MISO modules 502, 504 and others each receiving various inputs from sensors and outputting a useful result. Module 502 for example monitors airspeed as an important factor in UAV performance. Module 504 monitors fuel conditions. The detail within these modules will be described further below, with reference to FIGS. 6 and 7, respectively. In general, the inputs for these modules could be determined from sensors, the performances of the network system, uncertainly information from the environment, or human knowledge information.

The outputs of the modules 502, 504 etc. represents real-time monitoring information concerning the health of the various entities within the larger system, and is provided to a diagnostic stage 510. The airspeed result can be regarded as a single value on a performance scale 512. Similarly the fuel performance result can be regarded on another scale 514. Stage 510 performs what we call data/information fusion (D/IF) simply by using these lower-level health results as inputs to a further NFI-SRBO-MISO module 516. This and other similar modules provide their assessments of the key health parameters of the various entities to provide the failures/faults information to the third stage 520. Here, further NFI processes aggregate the lower level results until a single result or set of results representing health information of the SoS as a whole is represented on a scale 522. In terms of output linguistic values, this scale 522 might range from zero meaning called "OK" through levels such as "unstable" and "damaged" up to level 1 meaning "shutdown". At each point in time (each processing cycle) the value 524 can be reassessed and operational decisions made in reliance upon the current result. Complexity is compartmentalized by their hierarchical structure, so that the higher levels do not need to know why the vehicle or other entity is said to be unstable, damaged, etc.: only that it is.

Figure 6:
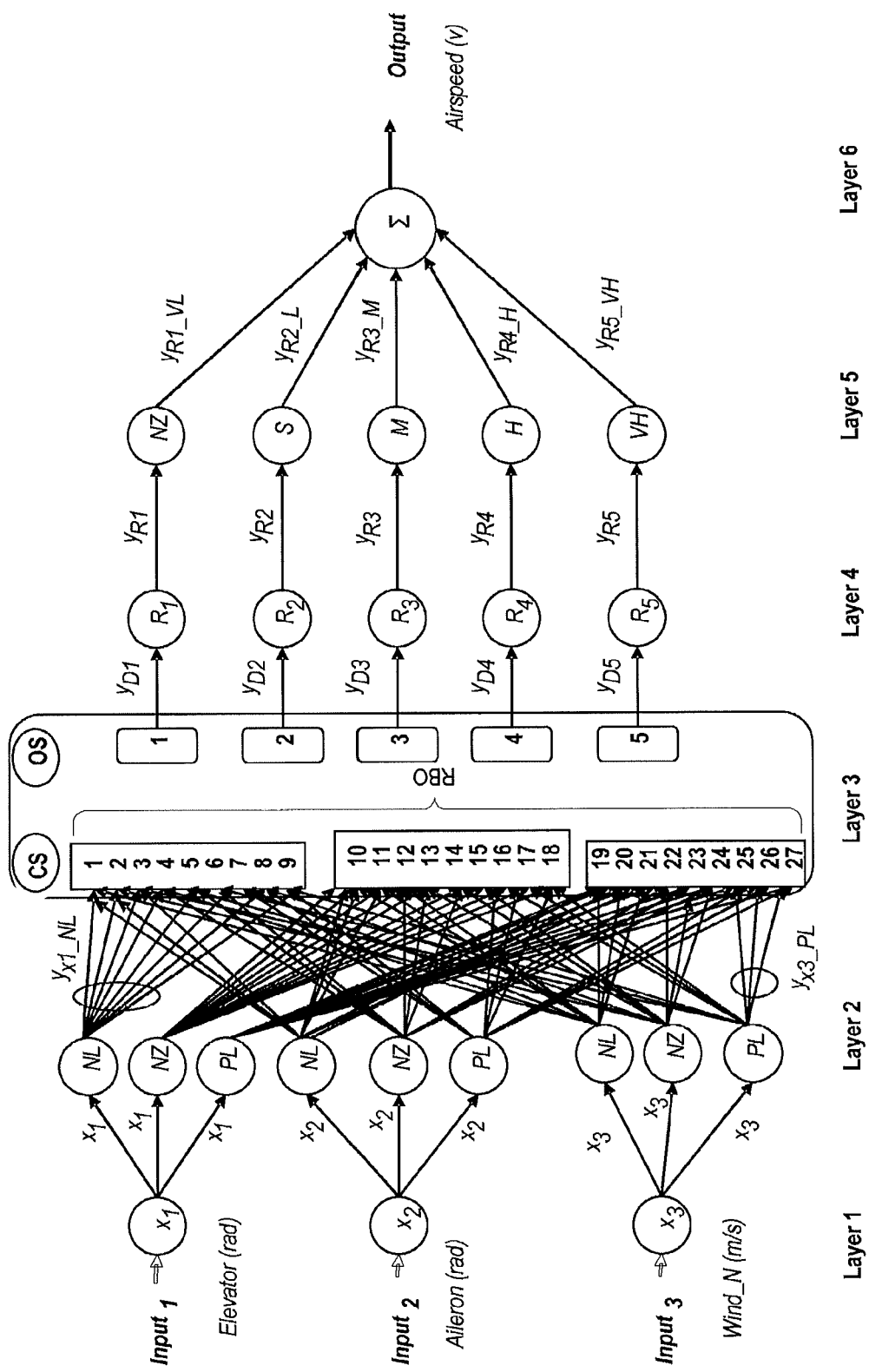
FIG. 6 illustrates a first fuzzy inference process within a UAV.

FIG. 6 shows the logical structure of the module 502 in the FIG. 5 system, which is clearly an implementation of the general NFI-SRBO-MISO model described above in relation to FIG. 3. For the UAV example, module 502 has an output representing airspeed. Input $x_1$ is elevator angle, input $x_2$ is a measurement of aileron angle and input $x_3$ is wind speed (headwind) in a particular direction. The sensors for the first two inputs are readily available. The 'wind sensor' for input $x_3$ is likely to be a combination of sensors mounted on the UAV itself. The wind speed & direction variable (uncertain variable) should be acquired by the sensors on the UAV. Values from wind sensors on the UAV will need to be compensated by GPS groundspeed to obtain relative values significant to the vehicle performance. Headquarters provides the environment (weather & terrain) information and area/target information to UAV before the mission starts, with optional updates. In a real system, headwind and crosswind values maybe separately significant and provided to the HM system as separate inputs.

In setting the membership functions and rules in this module, the values are selected according to the weather condition regime, as described further below.

Figure 7:
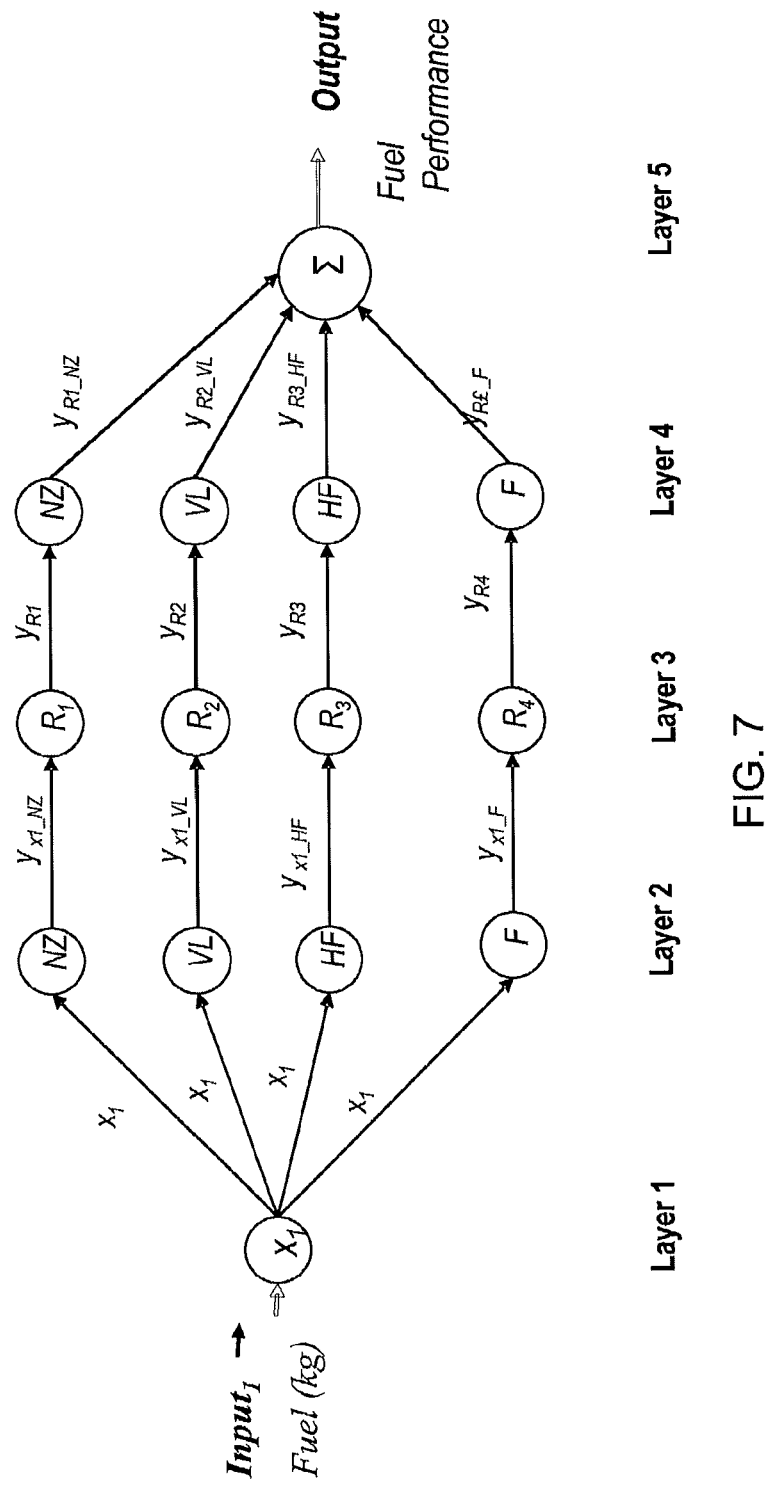
FIG. 7 illustrates a second fuzzy inference process within the same UAV.

FIG. 7 illustrates the fuzzy inference process for another module 504, which processes fuel level information from a suitable sensor and outputs fuel performance as an output. In principle, fuel level is just another input to the same general health monitoring problem as the other inputs mentioned above. From expert knowledge and/or observations in training and simulation, the designer knows that results of these outputs are only weakly interdependent. By separating this measure into its own (SISO) inference process, the designer reduces the complexity. Furthermore, the different fuzzy processes 502, 504 etc. may be repeated at very different rates, for example because fuel level varies only slowly in comparison with the aerodynamic variables, obstacle detection etc. By both these measures, the demand on real-time on-board processing hardware is greatly reduced.

As a result of the factors just described, the fuel monitoring process 504 is a simple 5-layer fuzzy inference process without online optimization. The designer can decide likewise whether it is beneficial for the membership functions and rules are to be adapted to different condition regimes in the manner described above.

Training for Different Conditions—UAV Example

Figure 8:
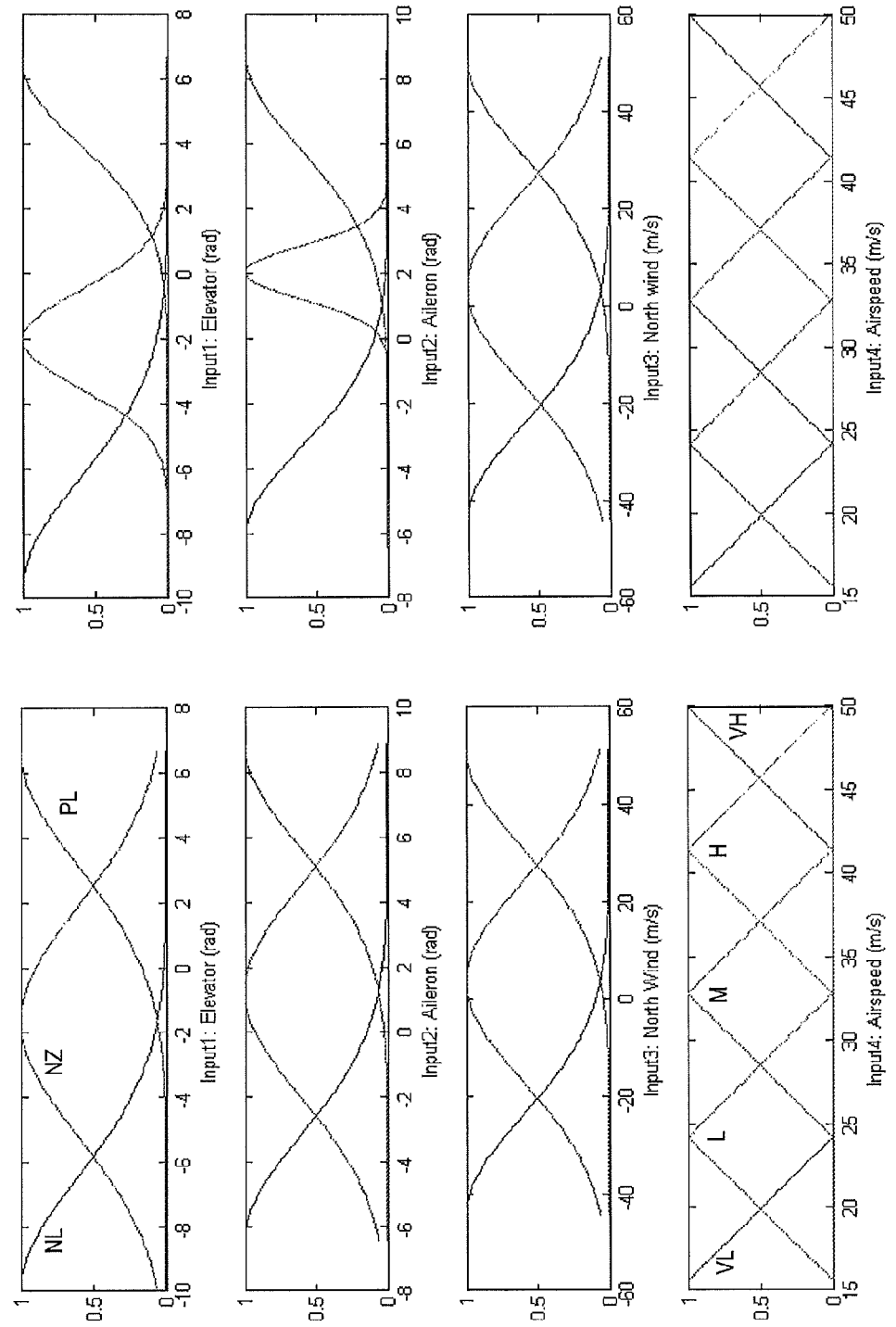
FIG. 8 illustrates (a) initial and (b) final fuzzy membership functions in the example application, trained for a "bad weather" condition.
Figure 9:
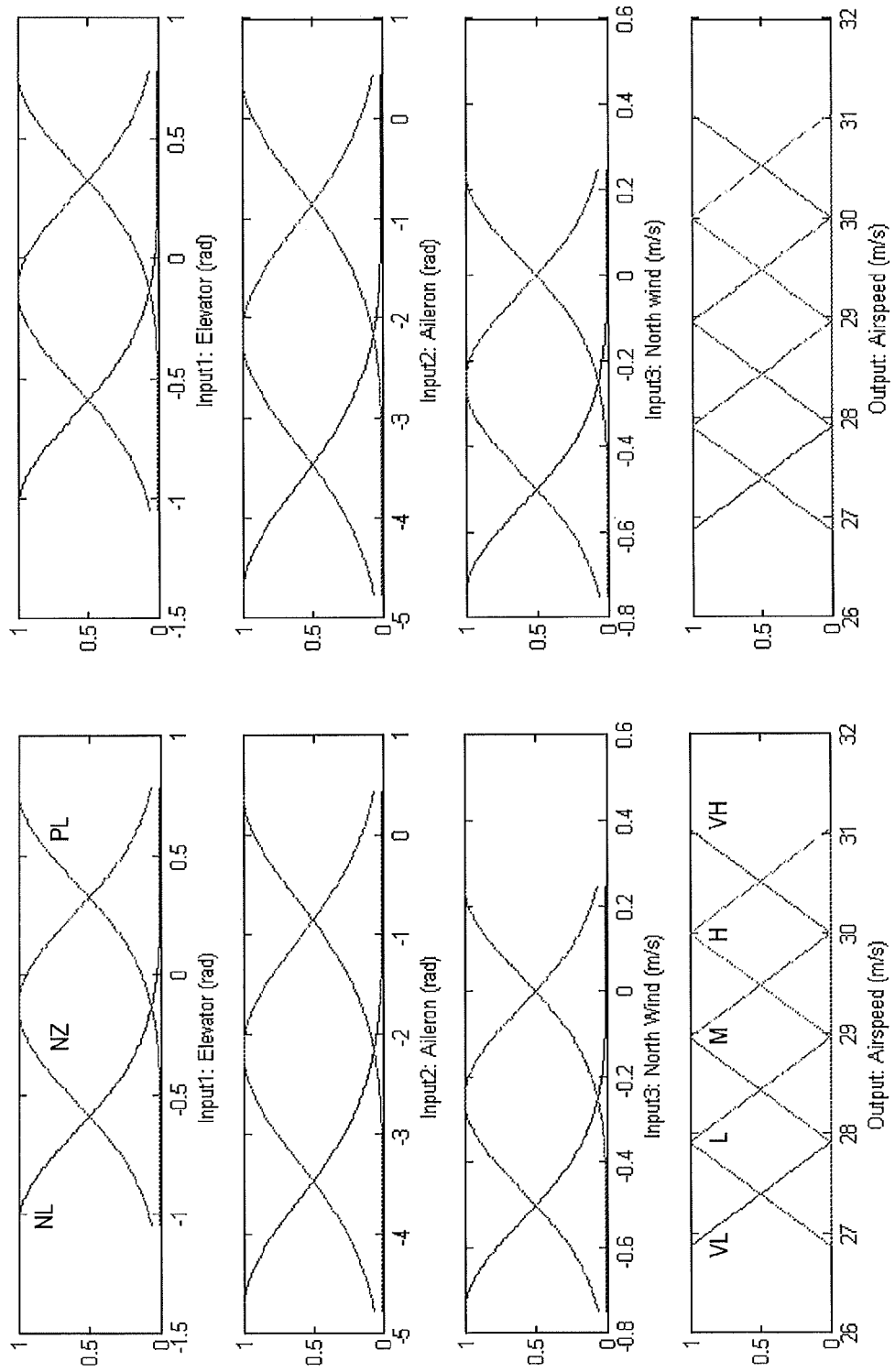
FIG. 9 illustrates (a) initial and (b) final fuzzy membership functions in the example application, trained for a "good weather" condition.

Returning to the module 502 shown in FIG. 6, the fuzzy rules for the airspeed calculation can be learned very differently according to whether a bad weather (windy) or good weather condition is expected. FIGS. 8 and 9 and the following discussion show these differences in a small example.

FIGS. 8(a) and (b) relate to the bad weather condition. We first define the initial conditions, and assign the membership values for the inputs and the output. Since the task is to monitor a UAV's airspeed during a mission, we define that the initial membership values for the bad weather condition are the elevator (input $x_1$) from −10 rad to 8 rad; the aileron ($x_2$) from −8 rad to 10 rad; the wind ($x_3$) from −60 m/s to 60 m/s, the fuel ($x_4$) from 5 kg to 0 kg. The output Airspeed membership value is from 18 m/s to 32 m/s. The inputs $x_1$ to $x_3$ can take the three LVs: negative large (NL=1), near zero (NZ=2), and positive large (PL=3). The fuel input $x_4$ can be near zero (NZ=4), very low (VL=3), half full (HF=2) or full (F=1). The output can take the five LVs: near zero (NZ or 1), small (S=2), medium (M=3), large (L=4) and very large (VL=5).

An established simulation model of the particular aircraft type is run and the training performed in a conventional manner. Alternatively, datasets recorded during actual flying could be used, or a combination. After the NFI learning and training of the initial MFs, the final MFs of elevator, aileron and winds will apply to the NFI-SRBO-MISO models. For training in bad weather conditions, strong winds are set up; the initial and final MFs for the elevator, the aileron and the winds are shown in FIGS. 8(a) and (b) respectively, and the final values repeated Table 1.

TABLE 1

Final MF parameters for the inputs and output (Bad weather conditions)

| I/O Name | Range | Membership Function | Final Value of MFs |
|---|---|---|---|
| Input1: Elevator | [−10 6.7] | Function: gaussmf<br>NL = 1; NZ = 2;<br>PL = 3. | [3.4 −9.7]<br>[1.5 −2]<br>[2.6 6.6] |
| Input2: Aileron | [−6.4 9] | Function: gaussmf<br>NL = 1; NZ = 2;<br>PL = 3. | [2.8 −6.2]<br>[0.8 2]<br>[3.1 8.9] |
| Input3: Winds | [−44.3 51.6] | Function: gaussmf<br>NL = 1; NZ = 2;<br>PL = 3. | [20.1 −44.4]<br>[20 3.7]<br>[20.4 51.5] |
| Input4: Fuel | [0 5] | Function: gaussmf<br>F = 1; HF = 2;<br>VL = 3; NZ = 4. | [2.5 0]<br>[1.5 4]<br>[3 5] |
| Output: Airspeed | [15.6 50] | Function: trimf<br>NZ = 1; S = 2;<br>M = 3; H = 4;<br>VL = 5. | [7 15.6 24.2]<br>[15.6 24.2 32.8]<br>[24.2 32.8 41.4]<br>[32.8 41.4 50]<br>[41.4 50 58.1] |

Training is then repeated with 'perfect' weather conditions (a light wind is set up rather than zero wind, so that the functions have something to respond to). We first define the initial conditions, and assign the membership values for the inputs $x_1$, $x_2$, $x_3$, $x_4$ and the output $o_{N1}$. Since the task is to monitor a UAV's airspeed during a mission, we define that the initial membership values for the perfect weather condition are the elevator ($x_1$) from −1.5 rad to 1 rad; the aileron ($x_2$) from −5 rad to 1 rad; the wind ($x_3$) from −1 m/s to 1 m/s, the fuel ($x_4$) from 5 kg to 0 kg. These initial values are different from those input for the bad weather training, and reflect human expert knowledge and/or previous training experience, which says that the control surfaces of the aircraft will be subject to milder actuations in light weather, compared with bad weather. The output Airspeed membership value is from 18 m/s to 32 m/s. The inputs $x_1$, $x_2$ and $x_3$ can take the three LVs: negative large (NL=1), near zero (NZ=2), and positive large (PL=3). The output can take the five LVs: near zero (NZ=1), small (S=2), middle (M=3), large (L=4) and very large (VL=5). MFs for the inputs are Gaussian, while the output MFs are triangular in the normal fashion.

The initial and final MFs are shown in FIGS. 9(a) and (b) respectively, and the final MFs are shown in more detail in Table 2 below.

TABLE 2

Final MF parameters for the inputs and output (Perfect weather condition)

| I/O Name | Range | Membership Function | Final Value of MFs |
|---|---|---|---|
| Input1: Elevator | [−1.05 0.79] | Function: gaussmf<br>NL = 1; NZ = 2;<br>PL = 3. | [0.35 −0.87]<br>[0.28 −0.36]<br>[0.33 0.67] |
| Input2: Aileron | [−4.78 0.45] | Function: gaussmf<br>NL = 1; NZ = 2;<br>PL = 3. | [1.11 −4.78]<br>[1.13 −2.11]<br>[1.07 0.52] |
| Input3: Winds | [−0.75 0.25] | Function: gaussmf<br>NL = 1; NZ = 2;<br>PL = 3. | [0.155 −075]<br>[0.076 −0.24]<br>[0.168 0.22] |
| Input4: Fuel | [0 5] | Function: gaussmf<br>F = 1; HF = 2;<br>VL = 3; NZ = 4. | [2.5 0]<br>[1.5 4]<br>[3 5] |
| Output1: Airspeed | [26.87 31.05] | Function: trimf<br>NZ = 1; S = 2;<br>M = 3; H = 4; | [25.83 26.87 27.9]<br>[26.87 27.92 28.97]<br>[27.92 28.99 29.89] |

TABLE 2-continued

Final MF parameters for the inputs and output (Perfect weather condition)

| I/O Name | Range | Membership Function | Final Value of MFs |
|---|---|---|---|
| | | VL = 5. | [28.98 30.01 31.04] |
| | | | [30.01 31.03 32.09] |

Comparing these graphs from a distance, we see already some differences in the MF shapes. Reviewing the scales on the graphs and the numerical values in the tables, however, the difference in the MF ranges becomes very clear. Thus, for example, training confirms that, in bad weather, a wind beyond 20 m/s might be regarded as large, but not, say 0-10 m/s. Elevator settings plus or minus several rads are to be expected in bad weather flying, but even a fractional adjustment could be regarded as large in good weather. At the output side, the aircraft is expected to control its airspeed very close to the nominal speed of around 29 m/s, but in bad weather, much wider variations are expected.

In each regime, the simulation results show a very good agreement between the 'actual' airspeed and that predicted or 'measured' by the NFI health monitoring model. Qualitatively, at least, these differences illustrate that, while such accuracy of modelling can be obtained with only a few LVs per variable in the bad weather regime or the good weather regime, the LV membership functions are very different between the two ranges. Accordingly, one must expect that, to obtain similar accuracy with a single set of fuzzy MFs and rules across both weather regimes would require, a wider number and range of LVs per input would be required, and hence a very much greater complexity.

Accordingly, we propose that performance of NFI systems can be improved and complexity reduced at the same time, by providing multiple fuzzy rule bases for a single inference task, each appropriate to a different set of environmental or similar conditions. Great benefit can thus be obtained by training the NFI system with data sets specific to each condition regime, and then arranging that information from sensors or other sources will be used to influence the selection of the knowledge base appropriate to the conditions prevailing during operation.

Training would also confirm that the fuel level has negligible input on the airspeed, certainly over short timescales, and so the exclusion of the fourth input from the airspeed calculation is justified.

Inference Process Detailed Example with Vectorisation

We provide now an illustration of the detail of the inference steps 13 to 16, in one implementation of the method described above. The processing of one group of rules in one cycle of the inference process will be described, it being understood that a practical system must process hundreds or even thousands of such rules per cycle, in real time. The example of the UAV just described will be used for illustration. In the preferred embodiment, a novel technique is used in the inference engines 122 to implement steps 13-16 above in a 'vectorised' way, reducing computational burden and facilitating parallel processing of values, where desired.

Suppose three inputs $i_{M1}$, $i_{M2}$ and $i_{M3}$ are described by three linguistic values (LVs) each: negative large (NL=1), near zero (NZ=2), and positive large (PL=3). The output oN1 is described by five LVs: near zero (NZ=1), small (S=2), middle (M=3), large (L=4) and very large (VL=5). Table 3 below is an original RBS matrix, Table 4 is a re-arranged RBS matrix, and Table 5 is the optimized (or resultant) RBS matrix.

TABLE 3

RBS Matrix (Original)

| Rule Number | Firing Strength (F) | Linguistic Value of Elevator (Input$_1$) | Linguistic Value of Aileron (Input$_2$) | Linguistic Value of Winds (Input$_3$) | Linguistic Value of Airspeed (Output) |
|---|---|---|---|---|---|
| 1 | $F_1^{VL}$ | 1 | 1 | 1 | 5 |
| 2 | $F_2^{L}$ | 1 | 1 | 2 | 4 |
| 3 | $F_3^{VL}$ | 1 | 1 | 3 | 5 |
| 4 | $F_4^{L}$ | 1 | 2 | 1 | 4 |
| 5 | $F_5^{M}$ | 1 | 2 | 2 | 3 |
| 6 | $F_6^{S}$ | 1 | 2 | 3 | 2 |
| 7 | $F_7^{NZ}$ | 1 | 3 | 1 | 1 |
| 8 | $F_8^{VL}$ | 1 | 3 | 2 | 5 |
| 9 | $F_9^{L}$ | 1 | 3 | 3 | 4 |
| 10 | $F_{10}^{M}$ | 2 | 1 | 1 | 3 |
| 11 | $F_{11}^{S}$ | 2 | 1 | 2 | 2 |
| 12 | $F_{12}^{NZ}$ | 2 | 1 | 3 | 1 |
| 13 | $F_{13}^{VL}$ | 2 | 2 | 1 | 5 |
| 14 | $F_{14}^{L}$ | 2 | 2 | 2 | 4 |
| 15 | $F_{15}^{M}$ | 2 | 2 | 3 | 3 |
| 16 | $F_{16}^{S}$ | 2 | 3 | 1 | 2 |
| 17 | $F_{17}^{NZ}$ | 2 | 3 | 2 | 1 |
| 18 | $F_{18}^{VL}$ | 2 | 3 | 3 | 5 |
| 19 | $F_{19}^{L}$ | 3 | 1 | 1 | 4 |
| 20 | $F_{20}^{20}$ | 3 | 1 | 2 | 3 |
| 21 | $F_{21}^{S}$ | 3 | 1 | 3 | 2 |
| 22 | $F_{22}^{NZ}$ | 3 | 2 | 1 | 1 |
| 23 | $F_{23}^{VL}$ | 3 | 2 | 2 | 5 |
| 24 | $F_{24}^{L}$ | 3 | 2 | 3 | 4 |
| 25 | $F_{25}^{M}$ | 3 | 3 | 1 | 3 |
| 26 | $F_{26}^{S}$ | 3 | 3 | 2 | 2 |
| 27 | $F_{27}^{NZ}$ | 3 | 3 | 3 | 1 |

In Table 4, all the rules have been re-arranged such that the rules inferred to a particular linguistic variable value of the output are grouped together, as described in Step 14 above (ordering can be performed in the offline stage).

TABLE 4

RBS Matrix (re-arranged)

| Rule Number | Linguistic Value of Elevator (Input$_1$) | Linguistic Value of Aileron (Input$_2$) | Linguistic Value of Winds (Input$_3$) | Linguistic Value of Airspeed (Output) |
|---|---|---|---|---|
| 7 | 1 | 3 | 1 | 1 | Near |
| 12 | 2 | 1 | 3 | 1 | Zero |
| 17 | 2 | 3 | 2 | 1 | (NZ) |
| 22 | 3 | 2 | 1 | 1 | |
| 27 | 3 | 3 | 3 | 1 | |
| 6 | 1 | 2 | 3 | 2 | Small |
| 11 | 2 | 1 | 2 | 2 | (S) |
| 16 | 2 | 3 | 1 | 2 | |
| 21 | 2 | 1 | 3 | 2 | |
| 26 | 3 | 3 | 2 | 2 | |
| 5 | 1 | 2 | 2 | 3 | Middle |
| 10 | 2 | 1 | 1 | 3 | (M) |
| 15 | 2 | 2 | 3 | 3 | |
| 20 | 3 | 1 | 2 | 3 | |
| 25 | 3 | 3 | 1 | 3 | |
| 2 | 1 | 1 | 2 | 4 | Large |
| 4 | 1 | 2 | 1 | 4 | (L) |
| 9 | 1 | 3 | 3 | 4 | |
| 14 | 2 | 2 | 2 | 4 | |
| 19 | 3 | 1 | 1 | 4 | |
| 24 | 3 | 2 | 3 | 4 | |
| 1 | 1 | 1 | 1 | 5 | Very |
| 3 | 1 | 1 | 3 | 5 | Large |
| 8 | 1 | 3 | 2 | 5 | (VL) |
| 13 | 2 | 2 | 1 | 5 | |
| 18 | 2 | 3 | 3 | 5 | |
| 23 | 3 | 2 | 2 | 5 | |

Table 5 lists the results of the membership function values of the output corresponding to each linguistic variables after all the inference rules have been fired, with the input data for one cycle. The crisp values of this input data are: $i_1$=6.7, $i_2$=9, and $i_3$=20. The optimisation of steps 15 and 16 above has been performed, so that only the dominant rule remains for each output LV.

TABLE 5

RBS Matrix (optimised) $i_1$ = 6.7; $i_2$ = 9; $i_3$ = 20

| Rule Number | Firing Strength max(min(F)) | Linguistic Value of Elevator (Input$_1$) | Linguistic Value of Aileron (Input$_2$) | Linguistic Value of Winds (Input$_3$) | Linguistic Value of Airspeed (Output) | |
|---|---|---|---|---|---|---|
| 27 | $F_{27}^{NZ}$ = 0.3036 | 3 | 3 | 3 | 1 | NZ |
| 26 | $F_{26}^{S}$ = 0.7174 | 3 | 3 | 2 | 2 | S |
| 21 | $F_{21}^{M}$ = 0.0059 | 3 | 1 | 3 | 3 | M |
| 9 | $F_{9}^{L}$ = 0 | 1 | 3 | 3 | 4 | L |
| 8 | $F_{8}^{VL}$ = 0 | 1 | 3 | 2 | 5 | VL |

In order to implement the above inference process by a vectorised approach all the rules in Table 4 are each to be represented by a vector. The vector is 9-dimensional in this case, because there are three input variables and each has three linguistic variable fuzzy subsets. All the entries of these vectors are binary values labelled $D^r$:

$$D^r = [D_{11}{}^r D_{12}{}^r D_{13}{}^r D_{21}{}^r D_{22}{}^r D_{23}{}^r D_{31}{}^r D_{32}{}^r D_{33}{}^r]^T \quad (1)$$

For example, for the first rule in Table 1, the vector is $$[(1\ 0\ 0)(1\ 0\ 0)(1\ 0\ 0)]^T$$

Where subscript T indicates transpose, and '0' and '1' are conventional Boolean values indicating whether a corresponding one of the nine input LVs is relevant to the firing of this rule. Table 3 is thus transformed into Table 6 as below:

TABLE 6

Binary Representation of RBS Matrix (Original)

| Rule Number | 9-D Vectors (Inputs) | | | | | | | | | Linguistic Value of Airspeed (Output) |
|---|---|---|---|---|---|---|---|---|---|---|
| | 3-D Vectors (Input$_1$) | | | 3-D Vectors (Input$_2$) | | | 3-D Vectors (Input$_3$) | | | |
| | $D_{11}$ | $D_{12}$ | $D_{13}$ | $D_{21}$ | $D_{22}$ | $D_{23}$ | $D_{31}$ | $D_{32}$ | $D_{33}$ | |
| 1 | 1 | 0 | 0 | 1 | 0 | 0 | 1 | 0 | 0 | 5 |
| 2 | 1 | 0 | 0 | 1 | 0 | 0 | 0 | 1 | 0 | 4 |
| 3 | 1 | 0 | 0 | 1 | 0 | 0 | 0 | 0 | 1 | 5 |
| 4 | 1 | 0 | 0 | 0 | 1 | 0 | 1 | 0 | 0 | 4 |
| 5 | 1 | 0 | 0 | 0 | 1 | 0 | 0 | 1 | 0 | 3 |
| 6 | 1 | 0 | 0 | 0 | 1 | 0 | 0 | 0 | 1 | 2 |
| 7 | 1 | 0 | 0 | 0 | 0 | 1 | 1 | 0 | 0 | 1 |
| 8 | 1 | 0 | 0 | 0 | 0 | 1 | 0 | 1 | 0 | 5 |
| 9 | 1 | 0 | 0 | 0 | 0 | 1 | 0 | 0 | 1 | 4 |
| 10 | 0 | 1 | 0 | 1 | 0 | 0 | 1 | 0 | 0 | 3 |
| 11 | 0 | 1 | 0 | 1 | 0 | 0 | 0 | 1 | 0 | 2 |
| 12 | 0 | 1 | 0 | 1 | 0 | 0 | 0 | 0 | 1 | 1 |
| 13 | 0 | 1 | 0 | 0 | 1 | 0 | 1 | 0 | 0 | 5 |
| 14 | 0 | 1 | 0 | 0 | 1 | 0 | 0 | 1 | 0 | 4 |
| 15 | 0 | 1 | 0 | 0 | 1 | 0 | 0 | 0 | 1 | 3 |
| 16 | 0 | 1 | 0 | 0 | 0 | 1 | 1 | 0 | 0 | 2 |
| 17 | 0 | 1 | 0 | 0 | 0 | 1 | 0 | 1 | 0 | 1 |
| 18 | 0 | 1 | 0 | 0 | 0 | 1 | 0 | 0 | 1 | 5 |
| 19 | 0 | 0 | 1 | 1 | 0 | 0 | 1 | 0 | 0 | 4 |
| 20 | 0 | 0 | 1 | 1 | 0 | 0 | 0 | 1 | 0 | 3 |
| 21 | 0 | 0 | 1 | 1 | 0 | 0 | 0 | 0 | 1 | 2 |
| 22 | 0 | 0 | 1 | 0 | 1 | 0 | 1 | 0 | 0 | 1 |
| 23 | 0 | 0 | 1 | 0 | 1 | 0 | 0 | 1 | 0 | 5 |
| 24 | 0 | 0 | 1 | 0 | 1 | 0 | 0 | 0 | 1 | 4 |
| 25 | 0 | 0 | 1 | 0 | 0 | 1 | 1 | 0 | 0 | 3 |
| 26 | 0 | 0 | 1 | 0 | 0 | 1 | 0 | 1 | 0 | 2 |
| 27 | 0 | 0 | 1 | 0 | 0 | 1 | 0 | 0 | 1 | 1 |

Again the rules are re-arranged according to the linguistic values of the output, as in Table 7.

TABLE 7

Binary Representation of RBS Matrix (re-arranged)

| Rule | 9-D Vectors (Inputs) | | | | | | | | | | Linguistic Value of Airspeed (Output) |
|---|---|---|---|---|---|---|---|---|---|---|---|
| | 3-D Vectors (Input$_1$) | | | 3-D Vectors (Input$_2$) | | | 3-D Vectors (Input$_3$) | | | | |
| | $D_{11}$ | $D_{12}$ | $D_{13}$ | $D_{21}$ | $D_{22}$ | $D_{23}$ | $D_{31}$ | $D_{32}$ | $D_{33}$ | | |
| 7 | 1 | 0 | 0 | 0 | 0 | 1 | 1 | 0 | 0 | 1 | Near |
| 12 | 0 | 1 | 0 | 1 | 0 | 0 | 0 | 0 | 1 | 1 | Zero |
| 17 | 0 | 1 | 0 | 0 | 0 | 1 | 0 | 1 | 0 | 1 | (NZ) |
| 22 | 0 | 0 | 1 | 0 | 1 | 0 | 1 | 0 | 0 | 1 | |
| 27 | 0 | 0 | 1 | 0 | 0 | 1 | 0 | 0 | 1 | 1 | |

TABLE 7-continued

Binary Representation of RBS Matrix (re-arranged)

| | 9-D Vectors (Inputs) | | | | | | | | | Linguistic Value of Airspeed (Output) |
|---|---|---|---|---|---|---|---|---|---|---|
| | 3-D Vectors (Input$_1$) | | | 3-D Vectors (Input$_2$) | | | 3-D Vectors (Input$_3$) | | | |
| Rule | $D_{11}$ | $D_{12}$ | $D_{13}$ | $D_{21}$ | $D_{22}$ | $D_{23}$ | $D_{31}$ | $D_{32}$ | $D_{33}$ | |
| 6 | 1 | 0 | 0 | 0 | 1 | 0 | 0 | 0 | 1 | 2 Small |
| 11 | 0 | 1 | 0 | 1 | 0 | 0 | 0 | 1 | 0 | 2 (S) |
| 16 | 0 | 1 | 0 | 0 | 0 | 1 | 1 | 0 | 0 | 2 |
| 21 | 0 | 0 | 1 | 1 | 0 | 0 | 0 | 0 | 1 | 2 |
| 26 | 0 | 0 | 1 | 0 | 0 | 1 | 0 | 1 | 0 | 2 |
| 5 | 1 | 0 | 0 | 0 | 1 | 0 | 0 | 1 | 0 | 3 Middle |
| 10 | 0 | 1 | 0 | 1 | 0 | 0 | 1 | 0 | 0 | 3 (M) |
| 15 | 0 | 1 | 0 | 0 | 1 | 0 | 0 | 0 | 1 | 3 |
| 20 | 0 | 0 | 1 | 1 | 0 | 0 | 0 | 1 | 0 | 3 |
| 25 | 0 | 0 | 1 | 0 | 0 | 1 | 1 | 0 | 0 | 3 |
| 2 | 1 | 0 | 0 | 1 | 0 | 0 | 0 | 1 | 0 | 4 Large |
| 4 | 1 | 0 | 0 | 0 | 1 | 0 | 1 | 0 | 0 | 4 (L) |
| 9 | 1 | 0 | 0 | 0 | 0 | 1 | 0 | 0 | 1 | 4 |
| 14 | 0 | 1 | 0 | 0 | 1 | 0 | 0 | 1 | 0 | 4 |
| 19 | 0 | 0 | 1 | 1 | 0 | 0 | 1 | 0 | 0 | 4 |
| 24 | 0 | 0 | 1 | 0 | 1 | 0 | 0 | 0 | 1 | 4 |
| 1 | 1 | 0 | 0 | 1 | 0 | 0 | 1 | 0 | 0 | 5 Very |
| 3 | 1 | 0 | 0 | 1 | 0 | 0 | 0 | 0 | 1 | 5 Large |
| 8 | 1 | 0 | 0 | 0 | 0 | 1 | 0 | 1 | 0 | 5 (VL) |
| 13 | 0 | 1 | 0 | 0 | 1 | 0 | 1 | 0 | 0 | 5 |
| 18 | 0 | 1 | 0 | 0 | 0 | 1 | 0 | 0 | 1 | 5 |
| 23 | 0 | 0 | 1 | 0 | 1 | 0 | 0 | 1 | 0 | 5 |

Table 8 is the complete, re-arranged RBS Matrix ready for the vectorisation approach.

TABLE 8

Vector Representation for the RBS Matrix (re-arranged)

| Rule Number ($R_k$) | 9-D Vectors (Inputs) ($D_{mi}^r$) | LV of Inputs From Table 4. | LV of output ($LVO_{nq}$) | |
|---|---|---|---|---|
| 7 | $[1\ 0\ 0\ 0\ 0\ 1\ 1\ 0\ 0]^T$ | 131 | 1 | NZ |
| 12 | $[0\ 1\ 0\ 1\ 0\ 0\ 0\ 0\ 1]^T$ | 213 | | |
| 17 | $[0\ 1\ 0\ 0\ 0\ 1\ 0\ 1\ 0]^T$ | 232 | | |
| 22 | $[0\ 0\ 1\ 0\ 1\ 0\ 1\ 0\ 0]^T$ | 321 | | |
| 27 | $[0\ 0\ 1\ 0\ 0\ 1\ 0\ 0\ 1]^T$ | 333 | | |
| 6 | $[1\ 0\ 0\ 0\ 1\ 0\ 0\ 0\ 1]^T$ | 123 | 2 | S |
| 11 | $[0\ 1\ 0\ 1\ 0\ 0\ 0\ 1\ 0]^T$ | 212 | | |
| 16 | $[0\ 1\ 0\ 0\ 0\ 1\ 1\ 0\ 0]^T$ | 231 | | |
| 21 | $[0\ 1\ 0\ 1\ 0\ 0\ 0\ 0\ 1]^T$ | 213 | | |
| 26 | $[0\ 0\ 1\ 0\ 0\ 1\ 0\ 1\ 0]^T$ | 332 | | |
| 5 | $[1\ 0\ 0\ 0\ 1\ 0\ 0\ 1\ 0]^T$ | 122 | 3 | M |
| 10 | $[0\ 1\ 0\ 1\ 0\ 0\ 1\ 0\ 0]^T$ | 211 | | |
| 15 | $[0\ 1\ 0\ 0\ 1\ 0\ 0\ 0\ 1]^T$ | 223 | | |
| 20 | $[0\ 0\ 1\ 1\ 0\ 0\ 0\ 1\ 0]^T$ | 312 | | |
| 25 | $[0\ 0\ 1\ 0\ 0\ 1\ 1\ 0\ 0]^T$ | 331 | | |
| 2 | $[1\ 0\ 0\ 1\ 0\ 0\ 0\ 1\ 0]^T$ | 112 | 4 | L |
| 4 | $[1\ 0\ 0\ 0\ 1\ 0\ 1\ 0\ 0]^T$ | 121 | | |
| 9 | $[1\ 0\ 0\ 0\ 0\ 1\ 0\ 0\ 1]^T$ | 133 | | |
| 14 | $[0\ 1\ 0\ 0\ 1\ 0\ 0\ 1\ 0]^T$ | 222 | | |
| 19 | $[0\ 0\ 1\ 1\ 0\ 0\ 1\ 0\ 0]^T$ | 311 | | |
| 24 | $[0\ 0\ 1\ 0\ 1\ 0\ 0\ 0\ 1]^T$ | 323 | | |
| 1 | $[1\ 0\ 0\ 1\ 0\ 0\ 1\ 0\ 0]^T$ | 111 | 5 | VL |
| 3 | $[1\ 0\ 0\ 1\ 0\ 0\ 0\ 0\ 1]^T$ | 113 | | |
| 8 | $[1\ 0\ 0\ 0\ 0\ 1\ 0\ 1\ 0]^T$ | 132 | | |
| 13 | $[0\ 1\ 0\ 0\ 1\ 0\ 1\ 0\ 0]^T$ | 221 | | |
| 18 | $[0\ 1\ 0\ 0\ 0\ 1\ 0\ 0\ 1]^T$ | 233 | | |
| 23 | $[0\ 0\ 1\ 1\ 0\ 0\ 1\ 0\ 0]^T$ | 311 | | |

Now, the 9-dimensional vectors $D^r$ are converted into their complement vectors $\tilde{D}^r$, as shown in Equation (2) and in Table 9.

TABLE 9

Complement of Vectors $\tilde{D}^r$ for the RBS Matrix (re-arranged)

| Rule Number ($R_j^{LVOn}$) | 9-D Vectors (Inputs) ($\tilde{D}_{mi}^r$) | LV of Inputs From Table 4. | LV of output ($LVO_{nq}$) | |
|---|---|---|---|---|
| 7 | $[0\ 1\ 1\ 1\ 1\ 0\ 0\ 1\ 1]^T$ | 131 | 1 | NZ |
| 12 | $[1\ 0\ 1\ 0\ 1\ 1\ 1\ 1\ 0]^T$ | 213 | | |
| 17 | $[1\ 0\ 1\ 1\ 1\ 0\ 1\ 0\ 1]^T$ | 232 | | |
| 22 | $[1\ 1\ 0\ 1\ 0\ 1\ 0\ 1\ 1]^T$ | 321 | | |
| 27 | $[1\ 1\ 0\ 1\ 1\ 0\ 1\ 1\ 0]^T$ | 333 | | |
| 6 | $[0\ 1\ 1\ 1\ 0\ 1\ 1\ 1\ 0]^T$ | 123 | 2 | S |
| 11 | $[1\ 0\ 1\ 0\ 1\ 1\ 1\ 0\ 1]^T$ | 212 | | |
| 16 | $[1\ 0\ 1\ 1\ 1\ 0\ 0\ 1\ 1]^T$ | 231 | | |
| 21 | $[1\ 0\ 1\ 0\ 1\ 1\ 1\ 1\ 0]^T$ | 213 | | |
| 26 | $[1\ 1\ 0\ 1\ 1\ 0\ 1\ 0\ 1]^T$ | 332 | | |
| 5 | $[0\ 1\ 1\ 1\ 0\ 1\ 1\ 0\ 1]^T$ | 122 | 3 | M |
| 10 | $[1\ 0\ 1\ 0\ 1\ 1\ 0\ 1\ 1]^T$ | 211 | | |
| 15 | $[1\ 0\ 1\ 1\ 0\ 1\ 1\ 1\ 0]^T$ | 223 | | |
| 20 | $[1\ 1\ 0\ 0\ 1\ 1\ 1\ 0\ 1]^T$ | 312 | | |
| 25 | $[1\ 1\ 0\ 1\ 1\ 0\ 0\ 1\ 1]^T$ | 331 | | |
| 2 | $[0\ 1\ 1\ 0\ 1\ 1\ 1\ 0\ 1]^T$ | 112 | 4 | L |
| 4 | $[0\ 1\ 1\ 1\ 0\ 1\ 0\ 1\ 1]^T$ | 121 | | |
| 9 | $[0\ 1\ 1\ 1\ 1\ 0\ 1\ 1\ 0]^T$ | 133 | | |
| 14 | $[1\ 0\ 1\ 1\ 0\ 1\ 1\ 0\ 1]^T$ | 222 | | |
| 19 | $[1\ 1\ 0\ 0\ 1\ 1\ 0\ 1\ 1]^T$ | 311 | | |
| 24 | $[1\ 1\ 0\ 1\ 0\ 1\ 1\ 1\ 0]^T$ | 323 | | |
| 1 | $[0\ 1\ 1\ 0\ 1\ 1\ 0\ 1\ 1]^T$ | 111 | 5 | VL |
| 3 | $[0\ 1\ 1\ 0\ 1\ 1\ 1\ 1\ 0]^T$ | 113 | | |
| 8 | $[0\ 1\ 1\ 1\ 1\ 0\ 1\ 0\ 1]^T$ | 132 | | |
| 13 | $[1\ 0\ 1\ 1\ 0\ 1\ 0\ 1\ 1]^T$ | 221 | | |
| 18 | $[1\ 0\ 1\ 1\ 1\ 0\ 1\ 1\ 0]^T$ | 233 | | |
| 23 | $[1\ 1\ 0\ 0\ 1\ 1\ 0\ 1\ 1]^T$ | 311 | | |

$$\tilde{D}^r = [\tilde{D}_{11}^r\ \tilde{D}_{12}^r\ \tilde{D}_{13}^r\ \tilde{D}_{21}^r\ \tilde{D}_{22}^r\ \tilde{D}_{23}^r\ \tilde{D}_{31}^r\ \tilde{D}_{32}^r\ \tilde{D}_{33}^r]^T \qquad (2)$$

Where $\tilde{D}^r$ denotes the rth rule in its complementing binary vector form. Complementing can be done off-line so has no impact on real-time processing burden.

The fuzzification stage in a fuzzy system maps the crisp value of each input to the system onto a fuzzy value by means of a fuzzy membership degree. This degree can be obtained from the fuzzy membership functions for the inputs to the fuzzy system. In the vectorised approach, any set of measured data is first fuzzified and the linguistic variable values are also listed in a 9-dimensional vector f such as:

$$f = [f_{11}^r f_{12}^r f_{13}^r f_{21}^r f_{22}^r f_{23}^r f_{31}^r f_{32}^r f_{33}^r]^T \quad (3)$$

The inference process in the fuzzy system maps the fuzzy membership degrees of the inputs in each rule in the system onto a firing strength for this rule. The firing strength $f_r^{NZ}$ for the rule can be obtained by the formula in equations (4) and (5):

$$f_r^{NZ} = \min\{f + \tilde{D}^r\} = \min\left\{ \begin{bmatrix} f_{11}^r \\ f_{12}^r \\ f_{13}^r \\ f_{21}^r \\ f_{22}^r \\ f_{23}^r \\ f_{31}^r \\ f_{32}^r \\ f_{33}^r \end{bmatrix} + \begin{bmatrix} \tilde{D}_{11}^r \\ \tilde{D}_{12}^r \\ \tilde{D}_{13}^r \\ \tilde{D}_{21}^r \\ \tilde{D}_{22}^r \\ \tilde{D}_{23}^r \\ \tilde{D}_{31}^r \\ \tilde{D}_{32}^r \\ \tilde{D}_{33}^r \end{bmatrix} \right\} \quad (4)$$

Where the minimisation is taken over the elements of the vector sum, and where '+' represents simple arithmetic addition.

This process is repeated over all the fuzzy inference rules corresponding to the same linguistic variable of the output, i.e. NZ in the current case. Then, to find the dominant rule, the maximum value among all the resultant firing strengths is taken as the fuzzy subset membership value of this linguistic variable (of the output), as in:

$$F_{r_{NZ}}^{NZ} = \max\{f_7^{NZ} f_{12}^{NZ} f_{17}^{NZ} f_{22}^{NZ} f_{27}^{NZ}\} \quad (5)$$

Thus $F_{r_{NZ}}^{NZ}$ is a dominant rule in the group NZ, and this rule will be selected for linguistic value NZ.

For a worked example, in Tables 6 & 7, there are five rules which would produce "Output is 'Near Zero'". These five rules are then represented in the stored knowledge base 130 by five 9-dimensional vectors such as Rule 7=$[100001 1001]^T$ and so on. Now, we take the complement of these vectors. So the first one (for Rule 7) is $[011110 0111]^T$ in the Table, and so on. These are done off-line, before particular data is to be used, so the complementing operation does not add any overhead in real time.

$$D^7 = \begin{bmatrix} 1 \\ 0 \\ 0 \\ 0 \\ 0 \\ 1 \\ 1 \\ 0 \\ 0 \end{bmatrix} \rightarrow \text{(compliment of } D^7\text{): } \tilde{D}^7 = \begin{bmatrix} 0 \\ 1 \\ 1 \\ 1 \\ 1 \\ 0 \\ 0 \\ 1 \\ 1 \end{bmatrix}$$

Now, any set of measured data (3 inputs) are first fuzzified, and the linguistic variable values are listed as a 9-dimensional vector, say $F_{r7}=[0.5, 0.3, 0.4, 0.4, 0, 0.9, 0.2, 0.3, 0.5]^T$. We assign the values here arbitrarily for the purposes of illustration only, assuming the input membership functions are expressed in a numerical range from 0.0 to 1.0. Then, we add this vector to each of the binary rule vectors by a vector sum operation.

So, by vector addition of Rule 7, the resultant 9-dimensional vector sum is $$[0.5, 1.3, 1.4, 1.4, 1.0, 0.9, 0.2, 1.3, 1.5]^T.$$

Next, we take the minimum value among the elements of this vector, which is 0.2. That is the minimum value of the 1st, 6th and 7th input (fuzzy) data which are the premises of this inference rule, and thus represents the firing strength of the rule itself. The values corresponding to the elements of the input vector which are not premises of this rule, although they are present in the vector sum, have been shifted out of the numerical range of the wanted values, so they are irrelevant to the outcome of the 'minimum' function.

The above steps are of course performed in a practical embodiment by the arithmetic and logic processing functions within inference engine 122. This then does the same steps with regard to other four rules for which the fuzzy value of the Output is "Near Zero".

$$f_7^{NZ} = \min\left\{ \begin{bmatrix} 0.5 \\ 0.3 \\ 0.4 \\ 0.4 \\ 0 \\ 0.9 \\ 0.2 \\ 0.3 \\ 0.5 \end{bmatrix} + \begin{bmatrix} 0 \\ 1 \\ 1 \\ 1 \\ 1 \\ 0 \\ 0 \\ 1 \\ 1 \end{bmatrix} \right\} = 0.2;$$

$$f_{12}^{NZ} = \min\left\{ \begin{bmatrix} 0.5 \\ 0.3 \\ 0.4 \\ 0.4 \\ 0 \\ 0.9 \\ 0.2 \\ 0.3 \\ 0.5 \end{bmatrix} + \begin{bmatrix} 1 \\ 0 \\ 1 \\ 0 \\ 1 \\ 1 \\ 1 \\ 1 \\ 0 \end{bmatrix} \right\} = 0.3;$$

$$f_{17}^{NZ} = \min\left\{ \begin{bmatrix} 0.5 \\ 0.3 \\ 0.4 \\ 0.4 \\ 0 \\ 0.9 \\ 0.2 \\ 0.3 \\ 0.5 \end{bmatrix} + \begin{bmatrix} 1 \\ 0 \\ 1 \\ 1 \\ 1 \\ 0 \\ 1 \\ 0 \\ 1 \end{bmatrix} \right\} = 0.3;$$

$$f_{22}^{NZ} = \min\left\{\begin{bmatrix} 0.5 \\ 0.3 \\ 0.4 \\ 0.4 \\ 0 \\ 0.9 \\ 0.2 \\ 0.3 \\ 0.5 \end{bmatrix} + \begin{bmatrix} 1 \\ 1 \\ 0 \\ 1 \\ 0 \\ 1 \\ 0 \\ 1 \\ 1 \end{bmatrix}\right\} = 0;$$

$$f_{27}^{NZ} = \min\left\{\begin{bmatrix} 0.5 \\ 0.3 \\ 0.4 \\ 0.4 \\ 0 \\ 0.9 \\ 0.2 \\ 0.3 \\ 0.5 \end{bmatrix} + \begin{bmatrix} 1 \\ 1 \\ 0 \\ 1 \\ 1 \\ 0 \\ 1 \\ 1 \\ 0 \end{bmatrix}\right\} = 0.4$$

The firing strength of the dominant rule is represented by:

$$F^{NZ} = \max\{f_7^{NZ} f_{12}^{NZ} f_{17}^{NZ} f_{22}^{NZ} f_2^{NZ}\} = \max\{0.2\ 0.3\ 0.3\ 0\ 0.4\} = 0.4$$

or more generally:

$$F_r^{LVOn} = \max\{\min\{f + \tilde{D}^r\}\} \quad (6)$$

Where
D$^r$ is the vectorisation of the linguistic value of inputs;
$\tilde{D}^r$ is the complement of D$^r$;
$\tilde{D}_{m,i}^r$ is the rule r in the complement of vectorisation of the i$^{th}$ linguistic value of input m;
$F_r^{LVOn}$ is the dominant rule r in the n$^{th}$ linguistic value of output;
n is the outputs number, here n=1;
m is the inputs number, here m=1, . . . , 3;
i is the number of the linguistic variable for input, i=1, 2, 3;
j is the number of the linguistic variable for output, j=1, 2, 3, 4, 5;
r is the fuzzy rule number, r=1, . . . , 27.

The results for all the LVs of the output are summarised in Table 10. Here, in the inference process, only additions are used, plus "min" and "max" functions. This gives advantage in terms of computation time/effort, compared with direct implementation of the fuzzy rules.

TABLE 10

Vectorisation for the RB Matrix (optimised)

| Rule Number | LV of Inputs ($i_1, i_2, i_3$) | Firing Strength* | 9-D Vectors (Inputs) ($\tilde{D}_{mi}^r$) | LV of output | |
|---|---|---|---|---|---|
| 27 | 333 | $F_{27}^{NZ} = 0.4$ | $[1\ 1\ 0\ 1\ 1\ 0\ 1\ 1\ 0]^T$ | 1 | NZ |
| 26 | 332 | $F_{26}^{S} = 0.3$ | $[1\ 1\ 0\ 1\ 1\ 0\ 1\ 0\ 1]^T$ | 2 | S |
| 20 | 312 | $F_{20}^{M} = 0.3$ | $[1\ 1\ 0\ 1\ 1\ 0\ 0\ 1\ 1]^T$ | 3 | M |
| 9 | 133 | $F_9^{L} = 0.5$ | $[0\ 1\ 1\ 1\ 1\ 0\ 1\ 1\ 0]^T$ | 4 | L |
| 3 | 133 | $F_3^{VL} = 0.4$ | $[0\ 1\ 1\ 1\ 1\ 0\ 1\ 0\ 1]^T$ | 5 | VL |

The term 'vector' is used herein to refer to an array of values, especially a 1-dimensional array. Vector addition is used, in which each element of one vector or array is added to the corresponding element in another array, and the result is a vector sum having the same dimensions as the two vectors which are summed.

Note that the technique described uses an addition of the complement of the rule array as it might conventionally be represented, rather than the more obvious approach of multiplying each element by the rule array itself. By this step, the values corresponding to the premises of the rule and the values which are not premises of the rule are separated into distinct numerical ranges. There is thus no need to separate them by logical operations before finding the minimum value, and therefore lower computational overhead.

The exact form of representation of the values in the vectors is a matter of detailed implementation in whatever storage registers and arithmetic circuits are provided. In general, the membership degree values may take many values between a minimum and a maximum degree, while the rule array comprises an array of binary values, each element of the rule array having either a first value which is no greater than said minimum degree, or a second value which is no less than said maximum degree, in the formation of said vector sum. Membership degrees might be represented by 8-bit integers in the range 0 to 255, or by floating point numbers. Ranges may in principle be inverted so that 'minimum' and 'maximum', 'greater than' etc. have to be interpreted in the opposite way from normal, without departing from the principle and scope of the invention.

For example, when the membership degrees are represented on a scale from 0.0 to 1.0, the binary values 0.0 and 1.0 are suitable. Values irrelevant to the particular rule are shifted from the range [0.0, 1.0] to the range [1.0, 2.0], while relevant values are left (in this example) unchanged. The important thing is that the lowest possible value in the higher range cannot be less than the highest value in the lower range, even if they are equal. In other words, the ranges may be distinct for our purpose while sharing a common boundary value. For example, it is noted that (0.0+1.0) has the same value as (1.0+0.0). It is not important, in principle, whether one or both sets of values are shifted, provided proper attention is paid to the detail of the arithmetic (sign as well as magnitude) and the comparisons made to arrive correctly at the firing strength. All such variations are within the principle of the invention as set forth above.

Inference Process Applied to Fuzzy Control

Figure 10:
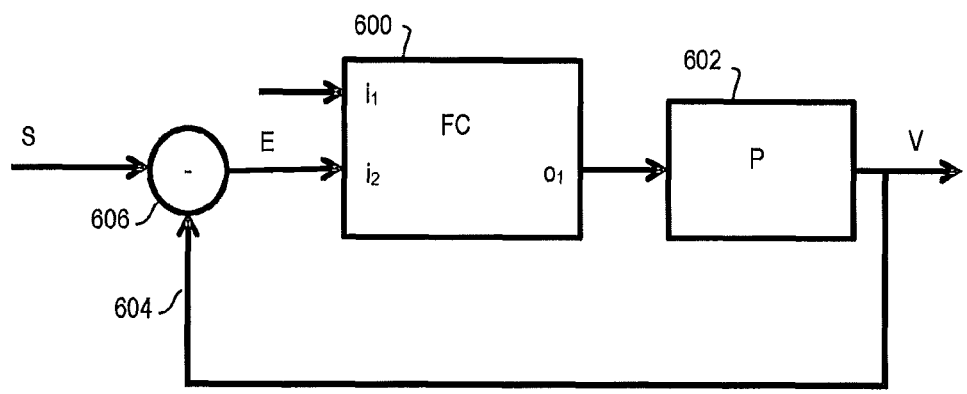
FIG. 10 is a schematic diagram of a fuzzy control system incorporating a fuzzy inference apparatus according to an embodiment of the invention.

FIG. 10 illustrates a second example system in which the fuzzy inference by vector addition may be applied. The system comprises a fuzzy controller (FC) 600, coupled to some form of plant (P) 602 which is to be controlled. Plant 602 may be a vehicle system or subsystem, an industrial robot, a chemical or mechanical process, or any of the machines and processes for which fuzzy control is suitable.

Fuzzy controller 600 comprises a microcontroller programmed to perform fuzzy inference between a number of input signals and a number of output signals. For the sake of example only, two input signals $i_1$ and $i_2$ are used in the fuzzy inference, and a single output signal $o_1$ is generated. The internal working of the controller with regard to fuzzy inference can be the same as that described in the health monitoring application example, or it may differ in many ways that will be appreciated readily by the skilled reader. Since this is a control application, output signal $o_1$ is applied through suitable actuators to influence plant 602 or its environment. Some state variable V of the plant is measured as the variable to be controlled, and the state variable V is fed back to the controller via feedback path 604. As is conventional, variable V is compared at 606 with a setpoint value S to generate an error signal E. Error E forms one of inputs $i_2$, while the other input $i_1$ may be an environment variable or a second state variable of the plant. The skilled person will readily recognise this simple form of feedback control loop.

Figure 11:
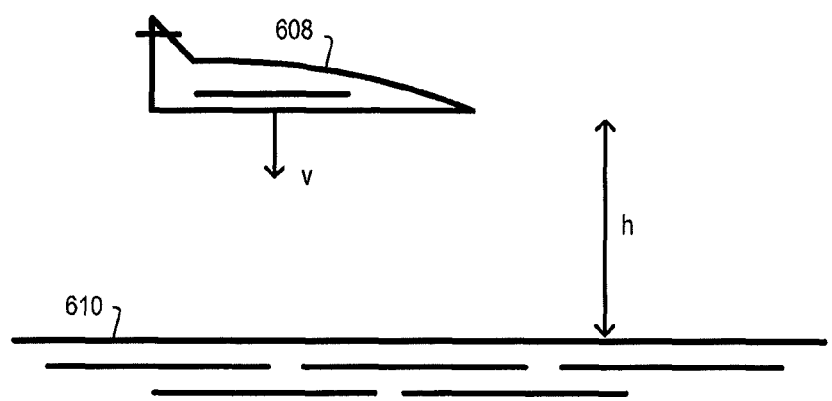
FIG. 11 illustrates an example application of the fuzzy control system.

As a very simple example application, FIG. 11 illustrates an airborne vehicle 608 coming to land on ground 610. using controller 600 and the system of FIG. 10, the plant 602 is the drive system of the vehicle, particularly in this case a vertical thrust control sub-system. State variable V is represented by the vehicle altitude, while ground level is regarded as the set point S for landing purposes. Height h above ground is therefore represented by error E which is input $i_2$ for the controller 600. Input $i_1$ may for example be a measurement of the vertical velocity v of the vehicle. Output $o_1$ is adjusted by the controller to apply a level of vertical thrust (upward or downward), in accordance with the result of fuzzy inference. Of course, in a real example, many more input and/or output variables and many more control loops may be present than in this simplified illustration.

CONCLUSION

Applying the technique of fuzzy inference by vector addition in the manner described above, brings important savings in computational burden when the controller 600 is implemented, Performance may be increased using the same processor, for example to increase the number of input or output variables, to increase the number of LVs per variable, to increase the number of rules, and/or to increase the frequency of the control loop. Alternatively or in addition, use of the vectorised technique may allow cost, power consumption and the like to be reduced without reducing the performance of an existing system. The vector addition technique can be applied in suitable cases by merely updating the software or firmware within the inference processor.

The above description presents the principles of the invention in various aspects together with a number of embodiments and variations of embodiments by which those principles can be implemented. The skilled reader will appreciate that these and other variations and modifications are possible to suit different applications and design criteria, without departing from the spirit or scope of the invention as defined in the appended claims.

What is claimed is:

1. A method of performing a fuzzy inference implemented in a programmable data processor or computer, the method comprising:
    (a) receiving one or more input values and generating an array of values each representing a membership degree of a respective input value in a pre-defined fuzzy set;
    (b) forming a vector sum of said array of membership degree values and a rule array representing a fuzzy rule of a fuzzy rule base, said rule array comprising a set of binary values, whereby forming said vector sum places each of said membership degree values, which initially all lie in a predetermined numerical range, into one of two distinct numerical ranges, according to a corresponding binary value in said rule array; and
    (c) processing elements of said vector sum to determine a firing strength for said fuzzy rule represented by said rule array.

2. The method as claimed in claim 1, comprising:
    a preliminary converting of a rule base into a binary array representation, prior to repeated performance of said method in a real-time processing application.

3. The method as claimed in claim 1, wherein said step (c) comprises:
    selecting a minimum element in said vector sum as said firing strength for said fuzzy rule represented by said rule array.

4. The method as claimed in claim 1, comprising:
    (d) repeating steps (b) and (c) for a plurality of rule arrays, each representing a different fuzzy rule; and (e) calculating an output value by reference to said firing strengths of said plurality of fuzzy rules.

5. The method as claimed in claim 4, wherein said step (e) includes:
    identifying a dominant rule among a group of rules, by identifying a maximum firing strength among said firing strengths calculated in said step (c).

6. The method as claimed in claim 5, wherein said group of rules is a group of rules associated with a particular linguistic value of said output, said maximum firing strength indicating a dominant rule, all other rules in said group being eliminated from calculation of said output value.

7. The method as claimed in claim 6, wherein said method is performed simultaneously for said group of rules and for other groups of rules associated with other linguistic values of a same output.

8. The method as claimed in claim 7, wherein said method is performed simultaneously for yet further groups associated with linguistic values of a further output value.

9. A processor adapted to perform fuzzy inference by a method claimed in claim 1.

10. An automated system for monitoring or control of a target apparatus, said system comprising an inference apparatus arranged to receive a plurality of input signals from sensors coupled to a target apparatus, to determine a set of membership degrees for each input and to perform fuzzy inference by a method comprising:
    (a) receiving one or more input values and generating an array of values each representing a membership degree of a respective input value in a pre-defined fuzzy set;
    (b) forming a vector sum of said array of membership degree values and a rule array representing a fuzzy rule of a fuzzy rule base, said rule array comprising a set of binary values, whereby forming said vector sum places each of said membership degree values, which initially all lie in a predetermined numerical range, into one of two distinct numerical ranges, according to a corresponding binary value in said rule array; and
    (c) processing elements of said vector sum to determine a firing strength for said fuzzy rule represented by said rule array.

11. The system as claimed in claim 10, comprising:
    a feedback path for applying said output value of said fuzzy inference to influence a state of said target apparatus.

12. The monitoring system as claimed in claim 10, comprising:
    an output for providing said output value of said fuzzy inference is provided as an output signal representing a condition or status of said apparatus or its environment.

13. A computer program product containing instructions which, when loaded into a programmable processing apparatus, implements a fuzzy inference processing apparatus or method, said instructions comprising:
    one or more instructions for (a) receiving one or more input values and generating an array of values each representing a membership degree of a respective input value in a pre-defined fuzzy set;
    one or more instructions for (b) forming a vector sum of said array of membership degree values and a rule array representing a fuzzy rule of a fuzzy rule base, said rule array comprising a set of binary values, whereby forming said vector sum places each of said membership degree values, which initially all lie in a predetermined numerical range, into one of two distinct numerical ranges, according to a corresponding binary value in said rule array; and one or more instructions for (c) processing elements of said vector sum to determine a firing strength for said fuzzy rule represented by said rule array.

14. The computer program product as claimed in claim 13 comprising:

one or more instructions for a preliminary converting of a rule base into a binary array representation, prior to repeated performance of said method in a real-time processing application.

15. The computer program product as claimed in claim 13 comprising:

one or more instructions for selecting, in said step (c), a minimum element in said vector sum as said firing strength for said fuzzy rule represented by said rule array.

16. The computer program product as claimed in claim 13 comprising:

one or more instructions for a step (d), said step (d) repeating steps (b) and (c) for a plurality of rule arrays, each representing a different fuzzy rule; and (e) calculating an output value by reference to said firing strengths of said plurality of fuzzy rules.

17. The computer program product as claimed in claim 16 comprising:

one or more instructions for said step (e) including identifying a dominant rule among a group of rules by identifying a maximum firing strength among said firing strengths calculated in said step (c).

18. The computer program product as claimed in claim 17 wherein said group of rules is a group of rules associated with a particular linguistic value of said output, said maximum firing strength indicating a dominant rule, all other rules in said group being eliminated from calculation of said output value.

19. The computer program product as claimed in claim 18 comprising:

one or more instructions for performing said method simultaneously for said group of rules and for other groups of rules associated with other linguistic values of a same output.

20. The computer program product as claimed in claim 19 comprising:

one or more instructions for performing said method simultaneously for yet further groups associated with linguistic values of a further output value.

* * * * *